United States Patent
McDysan

(10) Patent No.: US 6,226,260 B1
(45) Date of Patent: May 1, 2001

(54) METHOD AND SYSTEM FOR RESILIENT FRAME RELAY NETWORK INTERCONNECTION

(75) Inventor: David E. McDysan, Richardson, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/911,750

(22) Filed: Aug. 15, 1997

Related U.S. Application Data

(63) Continuation of application No. 08/581,263, filed on Dec. 29, 1995, now abandoned.

(51) Int. Cl.[7] .................................................. H04L 12/50
(52) U.S. Cl. .......................... 370/216; 370/396; 370/401; 370/410
(58) Field of Search .................................... 370/216, 225, 370/226, 227, 228, 389, 396, 397, 401, 402, 403, 410; 340/825.01, 827

(56) References Cited

U.S. PATENT DOCUMENTS

| | | | |
|---|---|---|---|
| 5,105,420 | * | 4/1992 | Ardon et al. ........................ 370/216 |
| 5,473,679 | * | 12/1995 | LaPorta et al. ..................... 370/410 |
| 5,490,140 | * | 2/1996 | Abensour et al. ................... 370/231 |
| 5,502,712 | * | 3/1996 | Akita .................................... 370/225 |
| 5,600,798 | * | 2/1997 | Cherukuri et al. ................... 370/401 |
| 6,094,419 | * | 7/2000 | Ohyoshi et al. ..................... 370/231 |

FOREIGN PATENT DOCUMENTS 0 484 943 A2  5/1992 (EP) .

OTHER PUBLICATIONS

Cohen et al., "Connection Management and Rerouting in ATM Networks," *Proceedings of the Conference on Computer Communications*, vol. 1, Jun. 12, 1994, pp. 184–191.

Shinbo et al., "Frame Relay and ATM Network Interworking for High Speed Public Data Communication Networks," *Proceedings of Interworking '94. 2nd International Symposium on Interworking*, May 1994, pp. 146–154.

Brown, C., "Follow Those Solitons for Future Bliss" *Electronic Engineering Times*, Sep. 18, 1995, pp69–70.

Bry, C., "Low–Cost Cards Can Help ATM Happen,", Electronic Engineering Times, Sep. 18, 1995, p. 60.

(List continued on next page.)

*Primary Examiner*—Douglas W. Olms
*Assistant Examiner*—Ken Vanderpuye

(57) ABSTRACT

A method and system for resilient internetwork connection of frame relay (FR) networks and/or end systems. For FR relay networks interconnected by a self-healing network, a standard protocol is provided which allows a resilient network-to-network interface NNI to automatically respond to physical interfaces failures detected by the self-healing network. Switching gateways in the resilient NNI, re-route further traffic to avoid the failed physical interface. In one embodiment, a simple set of interacting protocols and mechanisms control communication between FR/ATM gateways and ATM switches. Each FR/ATM gateway includes interworking function (IWF) processing modules for converting user data between frame relay packets and ATM cells and for processing status signaling messages to achieve a resilient NNI. Status signaling messages are used to determine when the physical interface which receives cell data differs from the physical interface over which data was sent as the result of a failure detected by the self-healing network. Cell traffic can then be switched to the receive ATM physical interface or to another pre-configured back-up physical interface. End-to-end resiliency is obtained between frame relay networks interconnected by a self-healing network which is not vulnerable to single point failure.

27 Claims, 16 Drawing Sheets

OTHER PUBLICATIONS

Grover, Wayne Ph.D., "Distributed Restoration of the Transport Network", *Network Management into the 21st Century*, Chptr. 11, IEEE Press (19_), p. 337.

McConnell, M., "LAN Switching on a Budget Can Be Done," *Electronic Engineering Times*, Sep. 18, 1995, p. 52.

O'Leary, D., "Frame Relay/ATM PVC Network Interworking Implementation Agreement," *Frame Relay Forum Technical Committee*, Dec. 29, 1994, pp 1–19.

Palm, P., "Turbo–LANs Run on ATM Backplanes," *Electronic Engineering Times*, Sep. 18, 1995, pp 64, 82.

Pratt, R., "Multimedia Over LANs is on Today's Menu," *Electronic Engineering Times*, Sep. 18, 1995, pp 52, 80, 82.

Rao, S., "Core Approach Logical for LAN Ics," *Electronic Engineering Times*, Sep. 18, 1995, p. 56.

Sammartino, F., "Turbocharging Backbone Nets," *Elec. Eng. Times*, Sep. 18, 1995, p. unknown.

Suer, M., "Video Rides Synchronous Bus to Digital Realm," *Elec. Eng. Times*, Sep. 18, 1995, p. 66.

Veil, l., "Tricky Road From Legacy LAN to ATM," *Elec. Eng. Times*, Sep. 18, 1995, p. 55.

Weider, S., "LAN Switches Key to Workgroup Performance," *Elec. Eng. Times*, Sep. 18, 1995, pp. 48, 84.

Wirbel, L. "Communications Design," *Elec. Eng. Times*, Sep. 18, 1995, pp 47, 72, 74, 76, 78.

Wu, T. "Emerging Technologies for Fiber Network Survivability," *IEEE Communications Magazine*, Feb. 1995, pp 58–74.

McDysan, D., et al, "ATM: Theory and Application," *McGraw–Hill, Inc.:* USA 1995.

\* cited by examiner

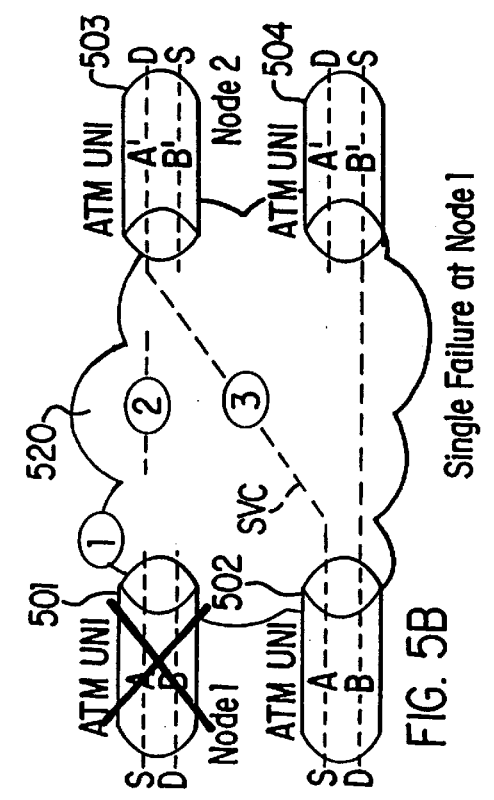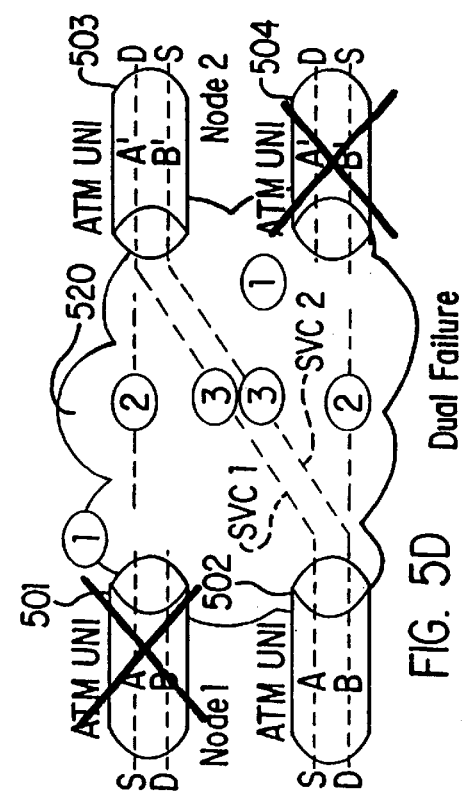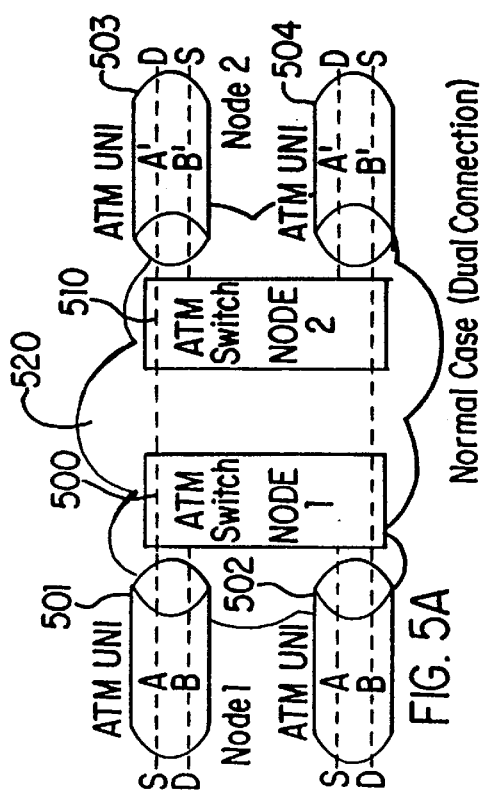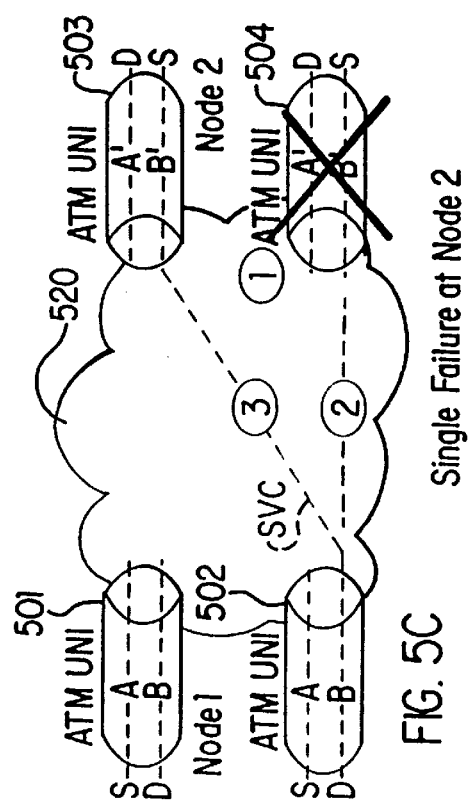

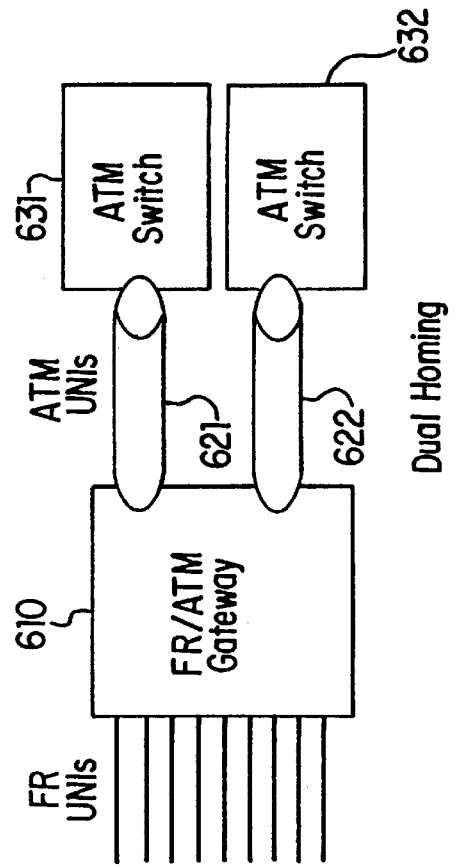
FIG. 6B  Dual Homing
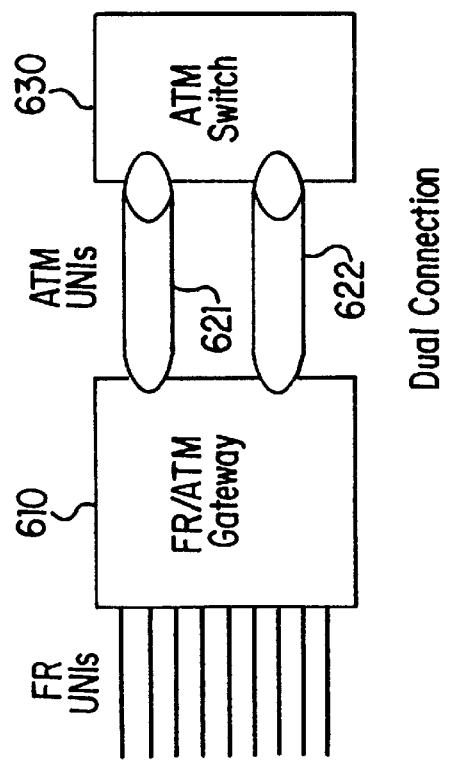
FIG. 6A  Dual Connection

METHOD AND SYSTEM FOR RESILIENT FRAME RELAY NETWORK INTERCONNECTION

This application is a continuation of application Ser. No. 08/581,263, filed Dec. 29, 1995, now abandoned.

BACKGROUND OF THE INVENTION

1. Field of the Invention

The present invention relates generally to computer internetworking. More particularly, the present invention is directed to a resilient internetwork connection between frame relay networks.

2. Related Art

Frame relay (FR) end user-systems or networks are interconnected by a separate data network. User-network interfaces link each FR end user-system to the data network. In commercial applications, these user-network interfaces include gateway switches provided in nodes near business premises for switching data between a FR network and the interconnecting data network. Greater volumes of vital communications traffic are now sought to be sent over long-distances between interconnected FR systems. Sound network-to-network interconnections which transfer data reliably and quickly from end-to-end without error is increasingly important.

Unfortunately, a number of problems can occur resulting in network-to-network failure. Physical trunk failures, such as a fiber cut, can halt communication between frame relay networks. For example, lightning, backhoes, train derailment, trawler nets, and shark attacks have been reported to have severed or impaired fiber connectivity. See, Grover, W., PhD., "Distributed Restoration of the Transport Network," p 337. Even more likely culprits for internetwork connection error are hardware and/or software created problems such as network-interface card (NIC) failure or human error in software loading.

Self-healing networks, such as asynchronous transfer mode (ATM) networks, can restore communication to overcome some types of failure. Restoration algorithms and protocols allow the self-healing network to re-route data within the self-healing network to avoid a faulty switch, node, or trunk. Even failures at a physical user-network interface connected to the self-healing network can be detected. A communication path within the self-healing network can be restored by switching to a pre-configured back-up path through the self-healing network.

Unfortunately, such resiliency of a self-healing network is limited to an internal response within the self-healing network. Without communication from the self-healing network, end-user systems remain unaware of a detected failure. Failures at the user-network interface are especially troublesome. For example, a broken physical interface linking an end user system and self-healing network will be detected and responded to by the resilient network. The ignorant end-user system, however, will continue to try to send and receive data through the failed physical interface. In this case, the Network-Network Interface (NNI) between the end-user network and the self-healing network is not resilient.

This problem is especially acute between interconnected frame relay networks. Frame Relay is only specified as a User-to-Network Interface (UNI) protocol. There is no standard protocol specified between a FR network and a self-healing network which allows a Network-Network Interface (NNI) to automatically detect a single point failure such as failed physical interface (or link). End-to-end performance suffers as the NNI cannot re-route traffic over non-failed or pre-configured back-up link(s). Thus, the lack of NNI resiliency prevents the interconnection of frame relay networks with end-to-end reliability which is not vulnerable to a single point failure.

What is needed then is a resilient interconnection from end-to-end between frame relay networks. A resilient NNI is needed which can re-route traffic to avoid a failed physical interface or link. For FR networks interconnected by a self-healing network, a standard protocol is needed which allows a NNI to automatically respond to physical interface failures detected by the self-healing network.

SUMMARY OF THE INVENTION

The present invention pertains to a method and system for a resilient internetwork connection of frame relay (FR) networks. For FR networks interconnected by a self-healing network, a standards-based protocol is provided which allows a resilient network-to-network interface (NNI) to automatically respond to physical interface failures detected by the self-healing network. In the resilient NNI, switching gateways re-route further traffic to avoid the failed physical interface. End-to-end resiliency is obtained between frame relay networks interconnected by a self-healing network which is not vulnerable to single point of failure.

In one embodiment of the present invention, a resilient NNI is provided between a FR network and a self-healing ATM network. A simple set of interacting protocols and mechanisms is provided between FR/ATM gateways and ATM switches. Each FR/ATM gateway includes interworking function (IWF) processing modules for converting user data between frame relay packets and ATM cells and for processing status signaling messages to obtain a resilient NNI. The status signaling messages are used to determine when the physical interface which receives cell data differs from the physical interface over which cell data was sent. This change in the receive physical interface indicates the self-healing network has switched from using the transmit physical interface due to a detected failure within the self-healing network, or at the destination gateway.

In one FR/ATM embodiment, each FR/ATM gateway includes a switch interconnecting FR-IWF and ATM-IWVF modules. According to the present invention, Tx ATM PHY and Rx ATM PHY fields are used internally within the FR/ATM gateway to identify the ATM physical interfaces through which cells are transmitted and received from the ATM network. Through status signaling messages, each ATM-IWF module transmits a Rx ATM PHY field in response to receiving ATM cells from the ATM network. Each FR-IWF module then compares Tx ATM-PHY and Rx ATM-PHY fields to determine whether the receive ATM physical interface differs from the transmit ATM physical interface as a result of self-healing in the ATM network. Cell traffic can then be switched to the receive ATM physical interface or to another pre-configured back-up physical interface.

Thus, the present invention takes advantage of the automatic self-healing in the ATM network by including interworking processing at each FR/ATM gateway to detect differences between transmit physical interfaces and receiver physical interfaces for each logical connection trunk. In this way, each FR/ATM gateway in response to status signaling messages can switch rapidly and accurately from a primary ATM UNI physical link to a back-up link. A resilient end-to-end frame relay system is realized which overcomes single-point failures, and even some dual failures in the interconnection network.

In general, a resilient NNI according to the present invention can be provided in any two FR switching nodes linked by a self-healing network, which may be as simple as two pairs of physical connections between the gateways. A four node full mesh design can also be realized. A further simple extension allows a two-level hierarchical network of resilient NM nodes to be implemented that can scale to very large sizes via a tandem FR/ATM switching function. Further hierarchical switching can employ the Virtual Path switching concept of ATM to support even larger networks.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention. In the drawings:

FIGS. 5A, 5B, 5C and 5D show example ATM switching scenarios in the event of ATM-UNI failures.

FIGS. 6A and 6B show interconnections of FR/ATMGateway to ATM Network Switches.

Figure 1:
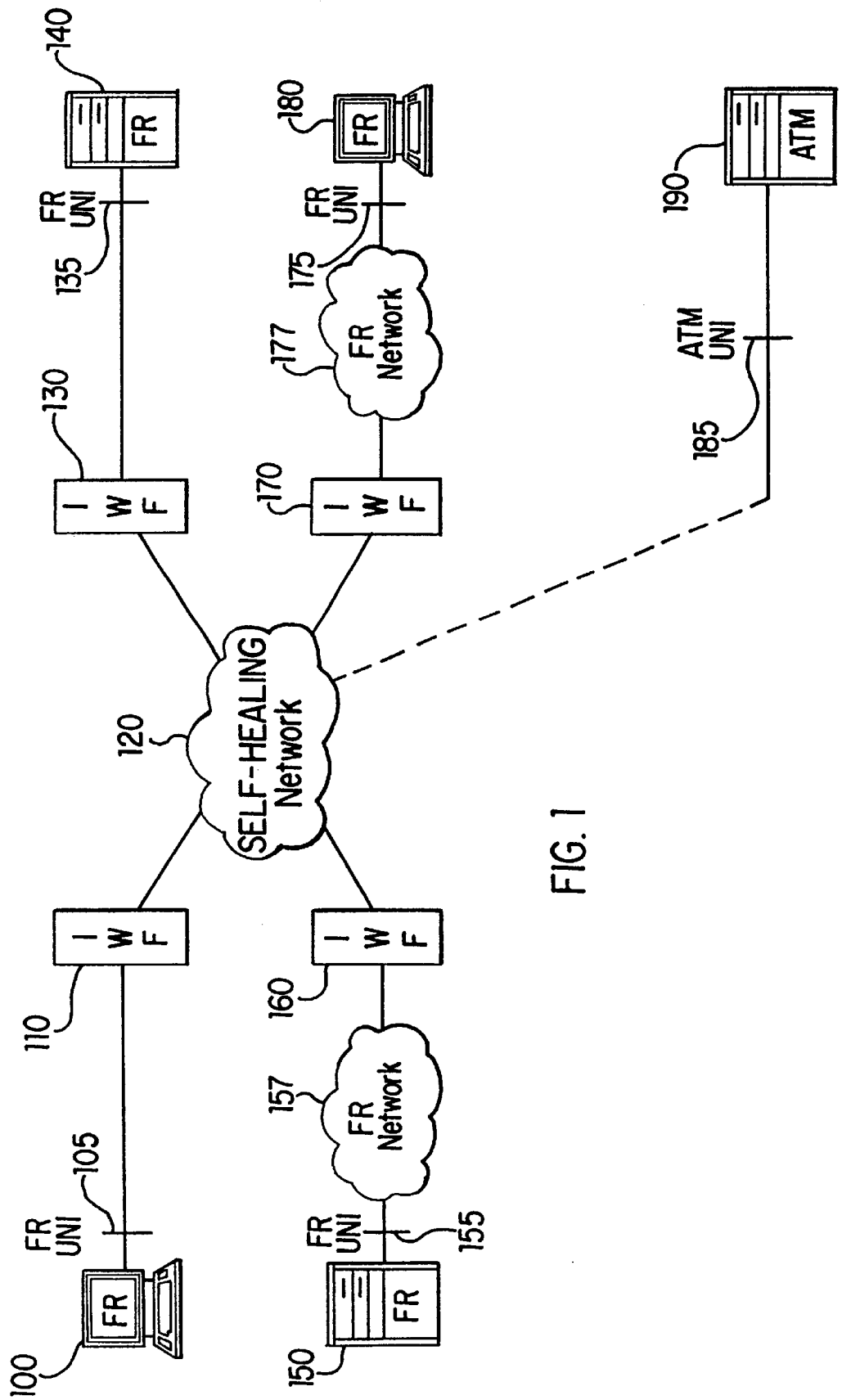
FIG. 1 is a block diagram illustrating different examples of different end systems and/or networks interconnected by a self-healing network.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE FIGURES

Table of Contents

I. Overview
II. Example Environment
III. FR/ATM Internetworking
IV. Resilient Network-Network Interface
   A. Example ATM Switching Scenarios in Event of ATM UNI Failures
   B. Interconnection of FR/ATM Gateway to ATM Network Switches
   C. Dual Homed Configuration ATM-UNI Fault Detection Mechanism
   D. Usage of Diverse ATM PVCs to Provide Resilient NNI
V. Frame Relay/ATM Gateway Block Diagram
   A. Frame Relay InterWorking Function (FR-IWF)
      1. Resilient NNI Module
   B. ATM InterWorking Function (ATM-IWF)
      1. Tx/Rx ATM-PHY/UNI Switching Module
VI. Example Four Node Full Mesh Network
VII. Illustration of Two-Level Hierarchy
VIII. Resilient NNI between Proprietary Frame Relay Networks
IX. Conclusion
X. Acronym Appendix

I. Overview

The present invention pertains to a resilient internetwork connection of frame relay (FR) networks. For FR relay networks interconnected by a self-healing network, a standard protocol is provided which allows a resilient network-to-network interface NNI to automatically respond to physical interface or node failures detected by the self-healing network. In the resilient NNI, switching gateways re-route further traffic to avoid the failed physical interface. End-to-end resiliency is obtained between frame relay networks interconnected by a self-healing network which is not vulnerable to single point failure.

In one embodiment, a resilient NNI is provided between a FR network and a self-healing ATM network. A simple set of interacting protocols and mechanisms control communication between FR/ATM gateways and ATM switches. Each FR/ATM gateway includes interworking function (IWF) processing modules for converting user data between frame relay packets and ATM cells and for processing status signaling messages to obtain a resilient NNI. The status signaling messages are used to determine when the physical interface which receives cell data differs from the physical interface over which data was sent, thereby indicating the self-healing network has switched from using the transmit physical interface due to a detected failure. Cell traffic can then be switched to the receive ATM physical interface or to another pre-configured back-up physical interface.

II. Example Environment

The present invention is described in the example environment of a communications internetwork for frame relay systems. Description in these terms is provided for convenience only. It is not intended that the invention be limited to application in this example environment. In fact, after reading the following description, it will become apparent to a person skilled in the relevant art how to implement the invention in alternative environments.

As shown in FIG. 1, a self-healing network 120 interconnects multiple frame relay end systems. Frame relay end terminal 100 is connected to the self-healing network 120 through a frame relay user-to-network interface (FR-UNI) 105 and a user gateway 110. Frame relay server 140 is likewise connected through FR-UNI 135 and gateway 130.

A user can also be interconnected via an intervening frame relay network.

Frame relay server 150 is connected to the self-healing network 120 through FR-UNI 155, FR Network 157, and gateway 160. Frame relay end terminal 180 is connected through FR-UNI 175, FR Network 177, and gateway 170.

As depicted in FIG. 1, each user-network gateway 110, 130, 160, and/or 170, includes Interworking Function (IWF) processing for converting, if necessary, data from a frame relay protocol format to the protocol used by the self-healing network.

In general, self-healing network 120 can be any computer network employing a protocol which supports multiple logical connections. The computer network must be able to self-detect a physical failure and must include a status signaling in its protocol indicative of a change between physical trunks and/or interfaces. For example, ATM, B-ISDN, Internet (TCP/IP), SNA, X.25, and even Frame Relay, can all be used as the self-healing network 120.

Finally, when the self-healing network is an ATM-type of network, an ATM end server system 190 can be connected as well through an ATM-UNI 185. Although FIG. 1 shows only single connects between the gateways 110, 130, 160 and 170, reliable network designs require duplication of these physical interfaces.

III. FR/ATM Internetworking

Figure 2:
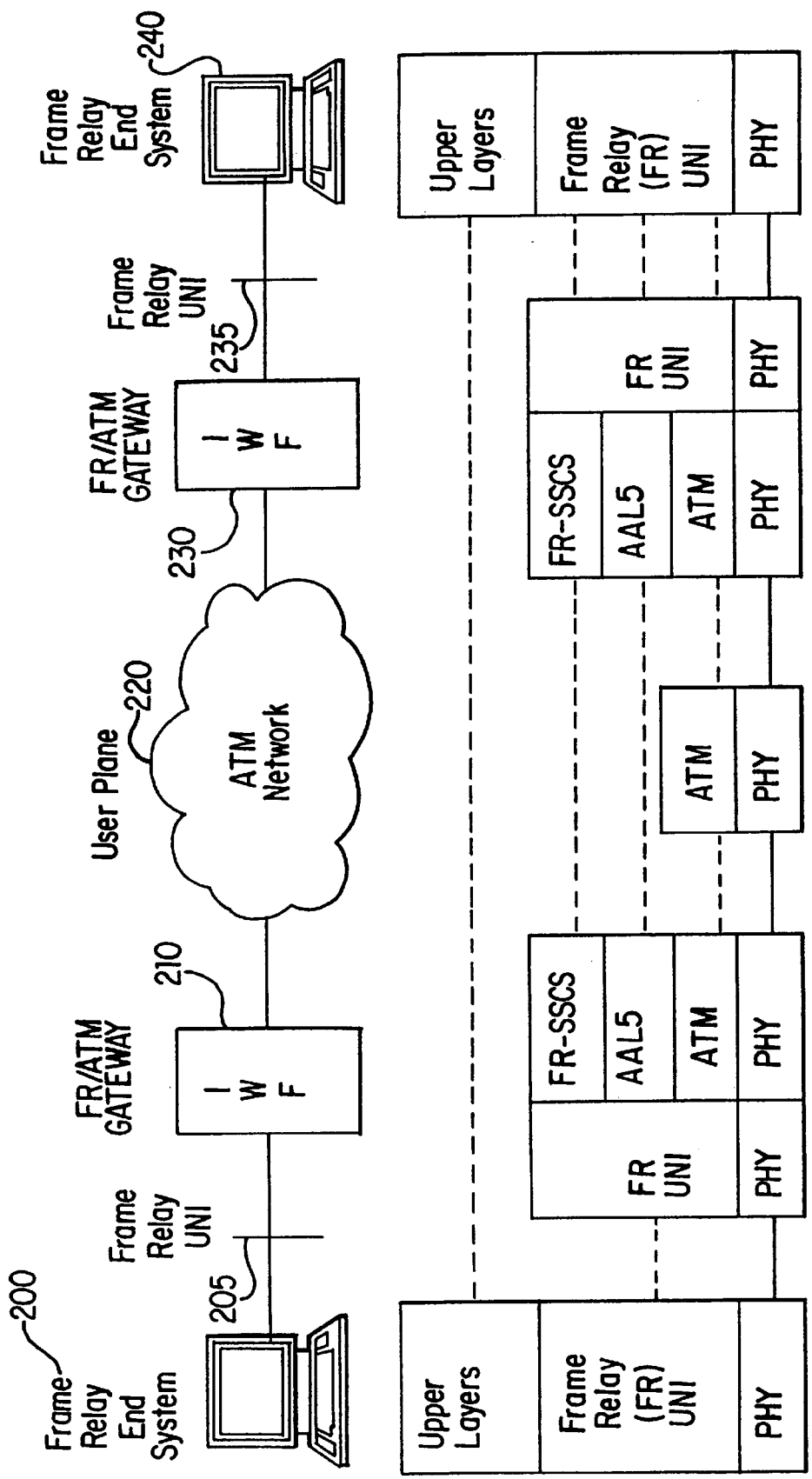
FIG. 2 is a block diagram of a FR/ATM internetwork including standard FR/ATM Network Interworking Scenario 1 Protocol Stacks.
Figure 3:
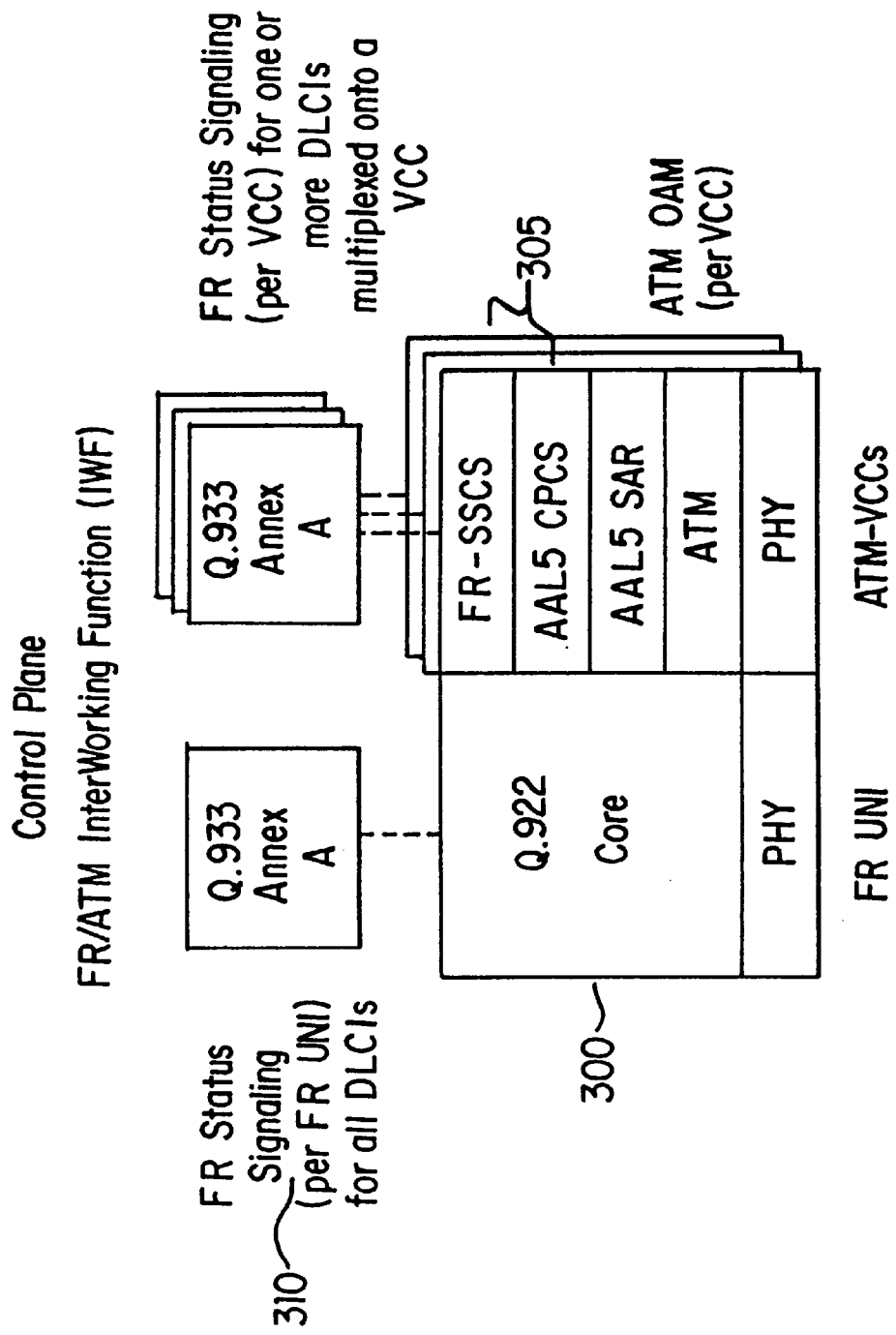
FIG. 3 shows a FR/ATM Interworking Function including FR Status Signaling Protocol Stacks.

FIGS. 2 and 3 illustrate a standard conversion of data between FR formatted user frames and ATM cells in a FR/ATM internetwork. FR end system 200 sends FR formatted user frames through FR-UNI 205 to FR/ATM gateway 210. FR/ATM gateway 210 converts the FR frames into ATM cells in a single Virtual Channel Connection (VCC) and switches the ATM cells for output over ATM network 220. The sequence is reversed as FR/ATM gateway 230 converts the ATM cells into FR formatted user frames. The received FR user frames are then switched for transmission over FR-UNI 235 to FR end system 240. Frames also are processed symmetrically from end system 240 to end system 200.

FR/ATM Gateways 210, 230 implement a standard FR/ATM Network Interworking protocol, such as, Scenario 1 as defined in ITU Recommendation 1.555, the ATM Forum B-ICI Specification Version 1.0, and the Frame Relay Forum Implementation Agreement FRF.5. Standard FR/ATM Network Interworking Scenario 1 user plane protocol stacks are provided along the bottom of FIG. 2 to illustrate the conversion of FR formatted frames between ATM cells.

FIG. 3 shows the operation of FR/ATM gateway 210 in performing the Interworking Function (IWF) to convert control, or status signaling frames to an ATM format. The protocol stacks 300 correspond to known Scenario I FR/ATM standards implementing the control plane of FR/ATM internetworking protocol. Such FR/ATM internetworking is described for example in the reference textbook by David E. McDysan et al., ATM: *Theory and Application*, (McGraw-Hill, Inc.: U.S.A.), 1995 (incorporated by reference in its entirety herein).

In the present invention, the Interworking function also maps FR status signals 310 to each of the ATM VCCs. Q.933 Annex A status signaling is mapped in a standard manner as summarized in the upper part 310 of FIG. 3. Implicit within the control plane interworking function of FIG. 3 is the demultiplexing of the Data Link Connection Identifier (DLCI) status indications of a single FR protocol stack 300 to multiple ATM VCC protocol stacks 305 in the FR-UNI to ATM VCC direction.

A status signaling message 310 identifies the status of each configured FR PVC using two bits Active (A), and New (N). The maximum number of FR DLCIs per link is (F-16)/5 for two octet FR headers, where F is the maximum frame size. For typical frame sizes the maximum number of Permanent Virtual Circuits (PVCs) is between 500 and 1,000. Each ATM VCC may carry one or more DLCIs using the Frame Relay Service Specific Convergence Sublayer (FR-SSCS), which is essentially the frame relay header used within the ATM VCC to multiplex multiple connections along with the FR status signaling.

Similarly, status signals from multiple ATM VCCs 305 are multiplexed into a single status message on the FR-UNI 300.

As will be described in more detail below, in the present invention the above IWF processing for converting data from frames to ATM cells and for mapping FR status signaling is distributed between frame-relay and ATM-IWF modules (FR-IWF, ATM-IWF) depending upon whether the particular FR/ATM gateway uses a frame-based or cell-based switch.

IV. Resilient Network-Network Interface

Figure 4:
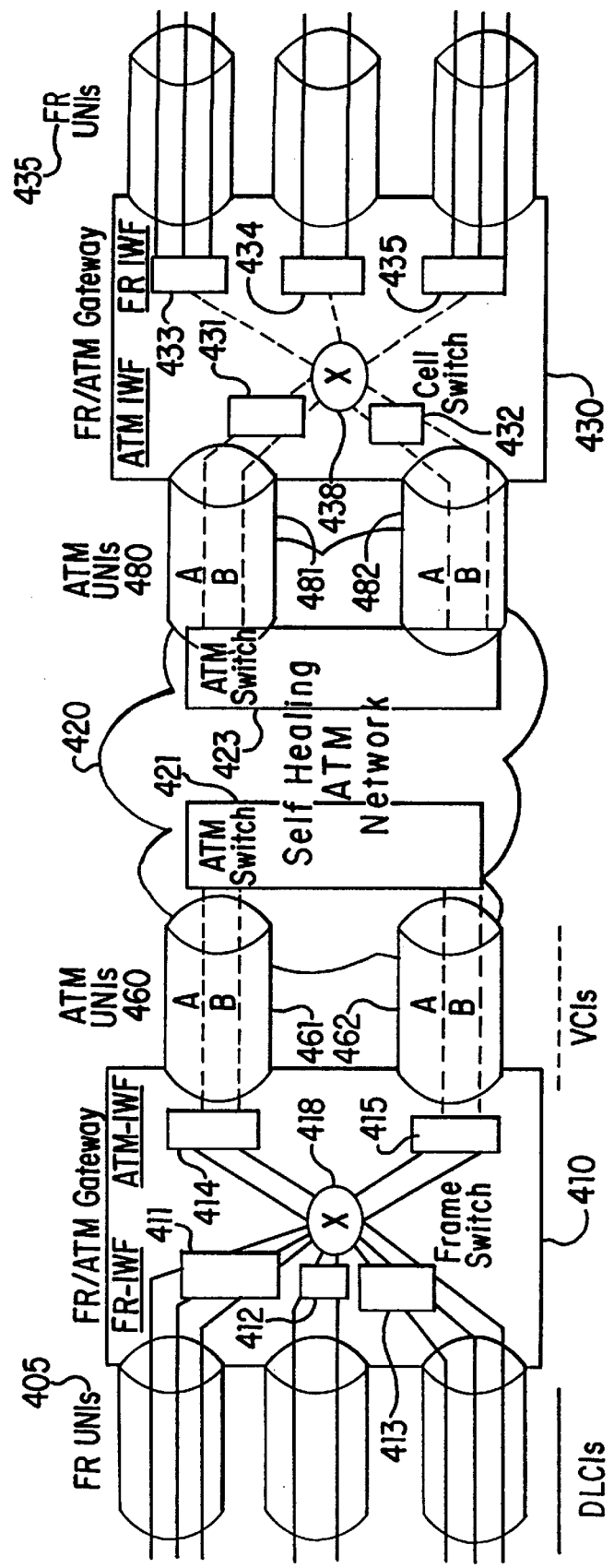
FIG. 4 is a block diagram of a resilient FR/ATM internetwork according to the present invention.

FIG. 4 shows with more detail a resilient FR/ATM internetwork according to a preferred embodiment of the present invention. Multiple FR physical interfaces (FR-UNIs) 405 and ATM physical interfaces 460 are connected to opposite sides of FR/ATM gateway 410. Multiple FR physical interfaces (FR-UNIs) 435 and ATM physical interfaces 480 are connected to opposite sides of FR/ATM gateway 430. Each FR physical UNI in sets 405, 435 contains a number of logical Data Link Connection Identifiers (DLCIs) for carrying frame relay formatted data between gateways 410 and 430.

FR/ATM gateway 410 further includes FR-IWF modules 411–413 coupled between respective FR-UNIs 405 and an internal frame switch 418. ATM-IWF modules 414, 415 are included in the FR/ATM gateway 410 between the frame switch 418 and respective ATM-UNIs 460. Similarly, FR/ATM gateway 430 further includes ATM-IWF modules 431, 432 coupled between respective ATM-UNIs 480 and an internal frame switch 438. FR-IWF modules 433–435 are included in the FR/ATM gateway 430 between the cell switch 438 and respective FR-UNIs 435.

In general, each FR/ATM gateway 410, 430 can use a frame-based or a cell-based switch. Interworking function (IWF) processing is distributed accordingly between the FR-IWF and ATM-IWF modules for converting between frame and cell data formats and mapping FR-ATM status signaling. The mapping of multiple Frame Relay DLCIs to a single Virtual Channel Connection (VCC) is called many-to-one multiplexing in the FR/ATM Network Interworking standards.

ATM physical interfaces 460, 480 are connected to self-healing ATM network 420 through respective ATM switch units 421, 423. In the event of a failure of an ATM UNI physical interface, an adversely effected ATM switch will automatically switch to an alternative, back-up ATM UNI physical interface. Hence, the pairs of physical ATM UNIs 461 and 462, and 481 and 482, operate as a resident FR-UNI as viewed from the FR/ATM gateways 410 and 430.

Protocols and systems for implementing such self-healing, for instance in response to a loss of an expected status, idle, or keep-alive signal, are well-known within a single homogenous network such as ATM. It is helpful to review several specific ATM switching scenarios responsive to different types of ATM UNI failure.

A. Example ATM Switching Scenarios in Event of ATM UNI Failures

Figure 7:
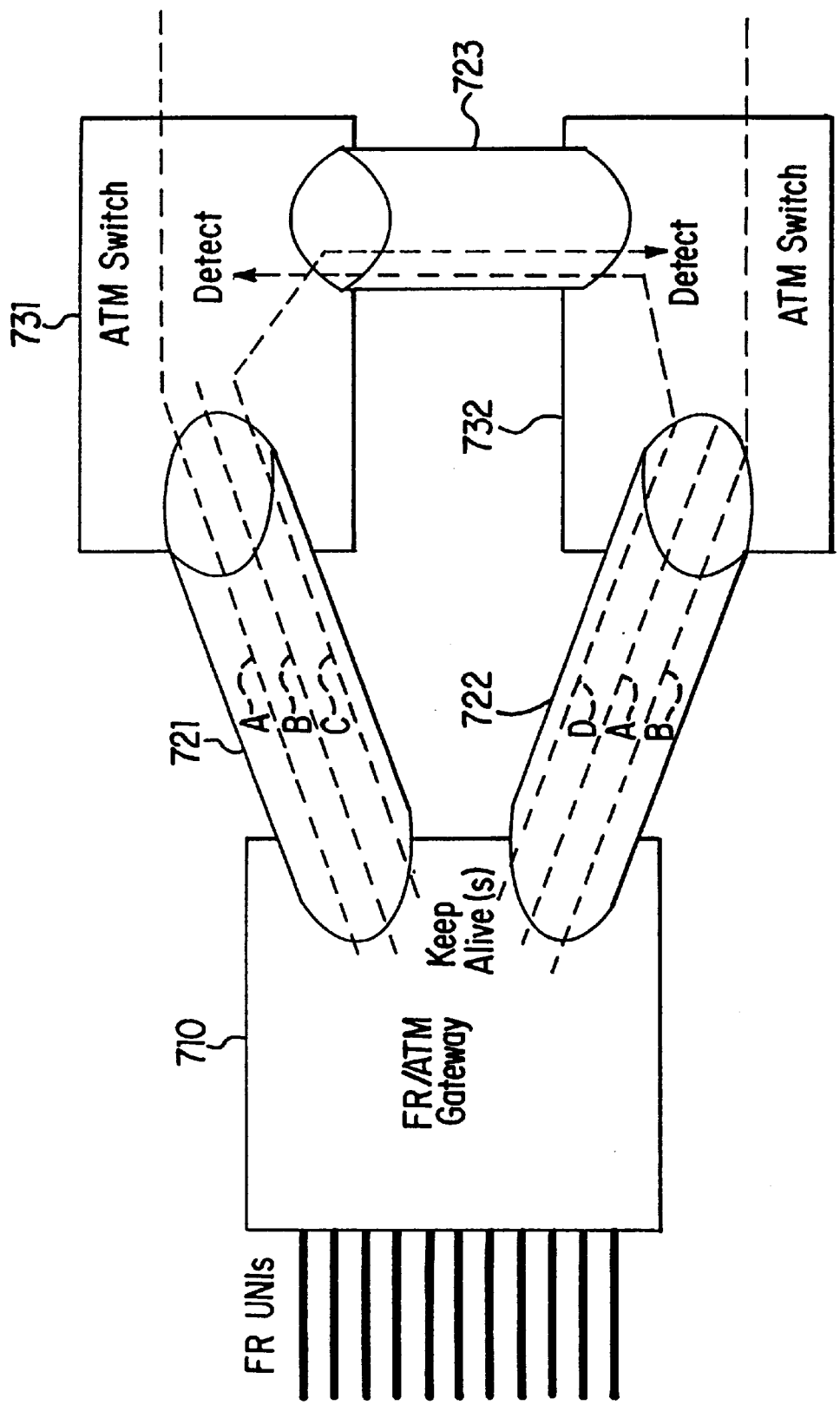
FIG. 7 shows a block diagram of dual homed diverse ATM switches linked by a separate UNI physical interface to detect a remote interface failure.

The operation of a self-healing ATM network 520 is described with reference to FIGS. 5A to 5D. In particular, ATM switches 500 and 510 detect ATM-UNI failures and restore communication with no or minimal interruption of service. A dual-connected arrangement is shown for simplicity. Other interconnection arrangements are described below with respect to FIGS. 6 to 8. ATM switches 500, 510 are not shown in FIGS. 5B to 5D for clarity.

FIG. 5A illustrates the normal working state of the resilient ATM network interconnecting two FR/ATM gateway nodes. ATM switch 500 is dual-connected to ATM-UNIs 501 and 502 at node 1. ATM switch 510 is also dual-connected to ATM-UNI 503 and 504 at node 2. To make the drawing clear, only two virtual channel connections VCC (A, A') and VCC (B, B') are shown in each physical interface ATM-UNIs 501–504. Each VCC has a respective source (S) and destination (D) in accordance with the flow of ATM cells through the respective ATM-UNI 501–504 physical interface.

In the simple, balanced load operation shown in FIG. 5A, a source VCC A on Node 1, ATM-UNI 501 is connected to a destination VCC A' on Node 2, ATM-UNI 503. A source VCC B' on Node 2, ATM-UNI 504 is likewise connected to destination VCC B on Node 1, ATM-UNI 502.

In this example, restoration of the self-healing ATM network is described using switched virtual connections (SVCs). The operation of the invention is independent of the restoration method the self-healing network employs.

FIG. 5B illustrates the case of a single source ATM UNI 501 (carrying VCC A) failure at Node 1 of ATM-UNI 501. In step 1, ATM switch 500 detects the absence of signals, i.e. status signals, from VCC A on ATM-UNI 501 of Node 1. ATM switch 500 then releases the Switched Virtual Connection (SVC) with ATM-UNI 503, Node 2, VCC A' in step 2. Finally, the ATM switch 500, initiates a new SVC between VCC A, ATM-UNI 502 and ATM-UNI 503, VCC A' in step 3 to reestablish connectivity between nodes 1 and 2.

FIG. 5C illustrates the case of a single source VCC B', ATM UNI 504, carrying failure on ATM-UNI 504 at Node 2. ATM switch 510 detects the failure (step 1) and causes the SVC to clear between ATM-UNI 502, VCC B at node 1 and ATM-UNI 504, VCC B' at node 2 (step 2). The ATM switch 510 then restores full connectivity between nodes 1 and 2 by establishing a new SVC between ATM-UNI 502, VCC B and ATM-UNI 503, VCC B'.

Combinations of these scenarios can be recovered by ATM switches 500 and 510 in the dual failure case illustrated in FIG. 5D. ATM switch 500 performs the steps 1 to 3 for establishing a SVC 1 in the same manner as described in FIG. 5B. ATM switch 510 perforns the steps 1 to 3 for establishing a SVC 2 in the same manner described in FIG. 5C. Connections internal to self-healing network 520 may be recovered internally to the network according to known techniques.

B. Interconnection of FR/ATM Gateway to A TM Network Switches

As described with respect to FIG. 4, ATM physical interfaces 460, 480 are connected to self-healing ATM network 420 through respective ATM switch units 421, 423. Each ATM switch unit 421, 423 can be configured for example in a dual-connection or dual homed arrangement. FIG. 6A shows an example of a FR/ATM Gateway 610 connected to the ATM network in a dual-connection configuration wherein diverse physical ATM UNIs 621, 622 are both connected to a single ATM switch 630.

Alternatively, in a dual-homed arrangement shown in FIG. 6B, two diverse ATM switches 631, 632 are connected to respective diverse physical interfaces ATM UNIs 621, 622. In commercial applications, dual homing arrangements are often preferred for security and reliability reasons. Each ATM switch can then be located in diverse physical locations, that is in nodes at different buildings. In this way, power outages or plant problems in one location will not disrupt internetwork communication entirely.

C. Dual Homed Configuration ATM-UNI Fault Detection Mechanism

The actions performed by the FR/ATM gateway are independent of the attachment to the ATM network. The ATM network operates differently depending upon the type of interconnection to a FR/ATM gateway. The ATM network protocol is simplest for a single dual-connection switch. When an FR/ATM gateway is connected to a single ATM switch the state of each dual-connected physical ATM UNI interface is known. Thus, a dual-connection of ATM-UNI physical interfaces 621, 622 to a common ATM switch 630, as described in FIG. 6A, is relatively simple to implement.

Dual-homed and other arrangements require communication between diverse ATM switches 731, 732. When the FR/ATM gateway 710 is dual homed to two ATM switches, the alternate source can periodically retry to reach its destination. Alternatively, as shown for example in FIG. 7, a VCC C, D can be sent through a physical interface 723 between the dual homed ATM switches 731, 732 to detect a remote interface failure in either physical interface 721, 722.

A further option is that the FR/ATM gateway 710 actually participates in the fault detection and signaling. Any of these fault detection and signaling methods achieve the resilient NNI function.

D. Usage of Diverse ATM PVCs to Provide Resilient NNI

Figure 8:
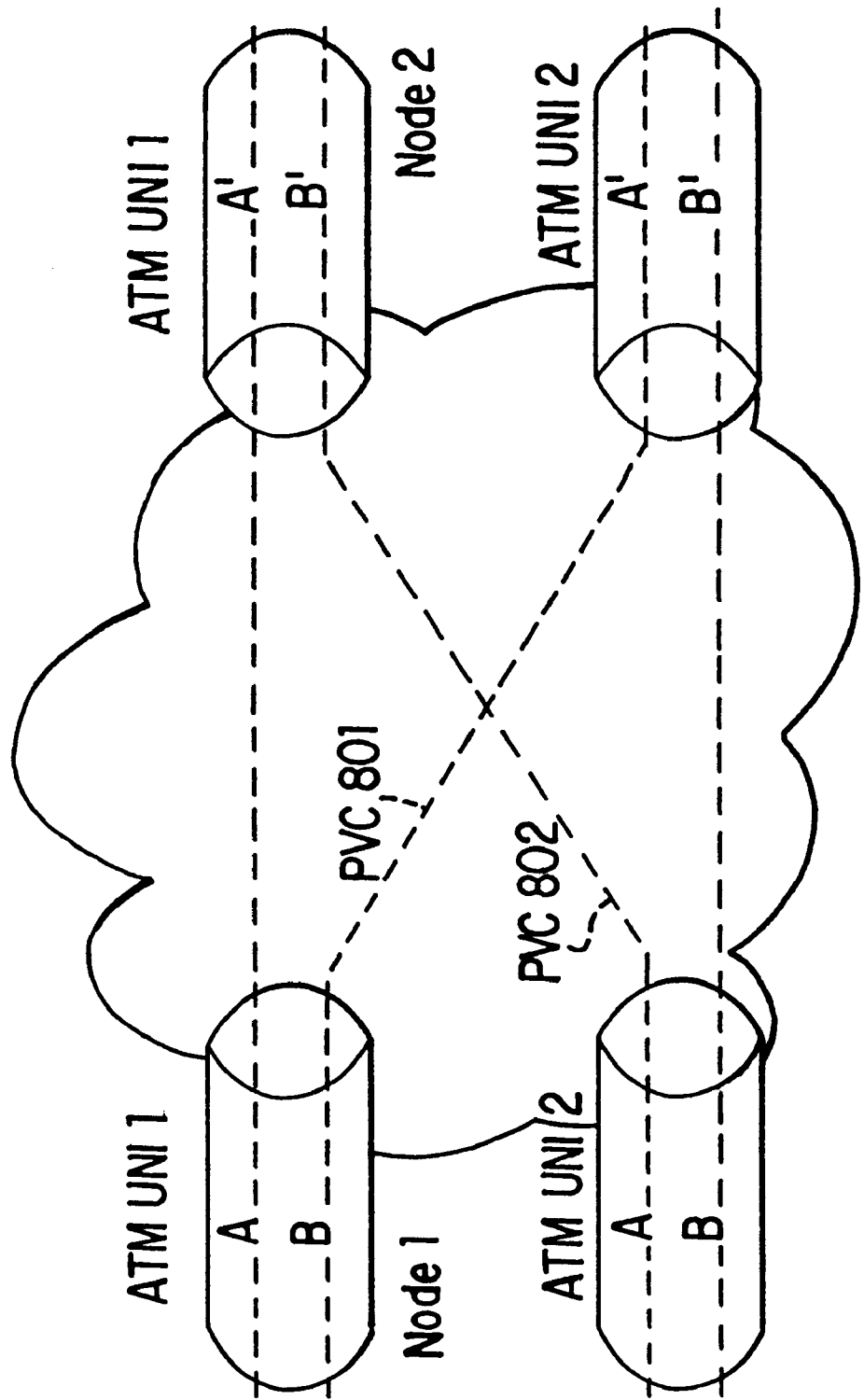
FIG. 8 shows usage of diverse ATM PVCs to provide a resilient NNI.

In FIG. 5, the ATM self-healing network 520 uses Switched Virtual Connections to restore connectivity. Alternatively, as shown in FIG. 8, the same function can be implemented using twice as much capacity with diversely routed ATM PVCs 801, 802. The operation of a FR/ATM gateway is slightly more complex in the case of ATM PVCs because a lack of status signaling must result in a timeout, and consequent switchover to the alternate PVCNVCC. Another disadvantage of a PVC solution is that two failures in the ATM network will cause one or more pairs of FR/ATM gateways to become disconnected.

The above discussion of FIGS. 5 to 8 describe general examples illustrating ATM switching and recovery. Protocols and systems for implementing such self-healing, for instance in response to a loss of an expected status, idle, or keep-alive signal, are well-known within a single homogenous network such as ATM. According to the present invention, however, resiliency is achieved in a NNI between FR networks interconnected to a self-healing network. For example, in the present invention, FR/ATM gateway 410 interacts with a corresponding ATM switch 421 through a simple set of protocols to achieve end-to-end resiliency between FR systems.

The present invention then takes advantage of the automatic self-healing of ATM switches in the ATM network as described above, by including *interworking processing at each FR/ATM gateway in a* NNI for detecting changes between the transmit physical interface and the received physical interface for each logical connection trunk. In this way, each FR/ATM gateway, in response to status signaling messages, can switch rapidly and accurately between a primary ATM UNI physical interface and at least one back-up ATM-UNI physical interface. A resilient end-to-end frame relay system is realized which overcomes single-point failures, and even some dual failures in the interconnection network.

V. Frame Relay/ATM Gateway Block Diagram

Figure 9:
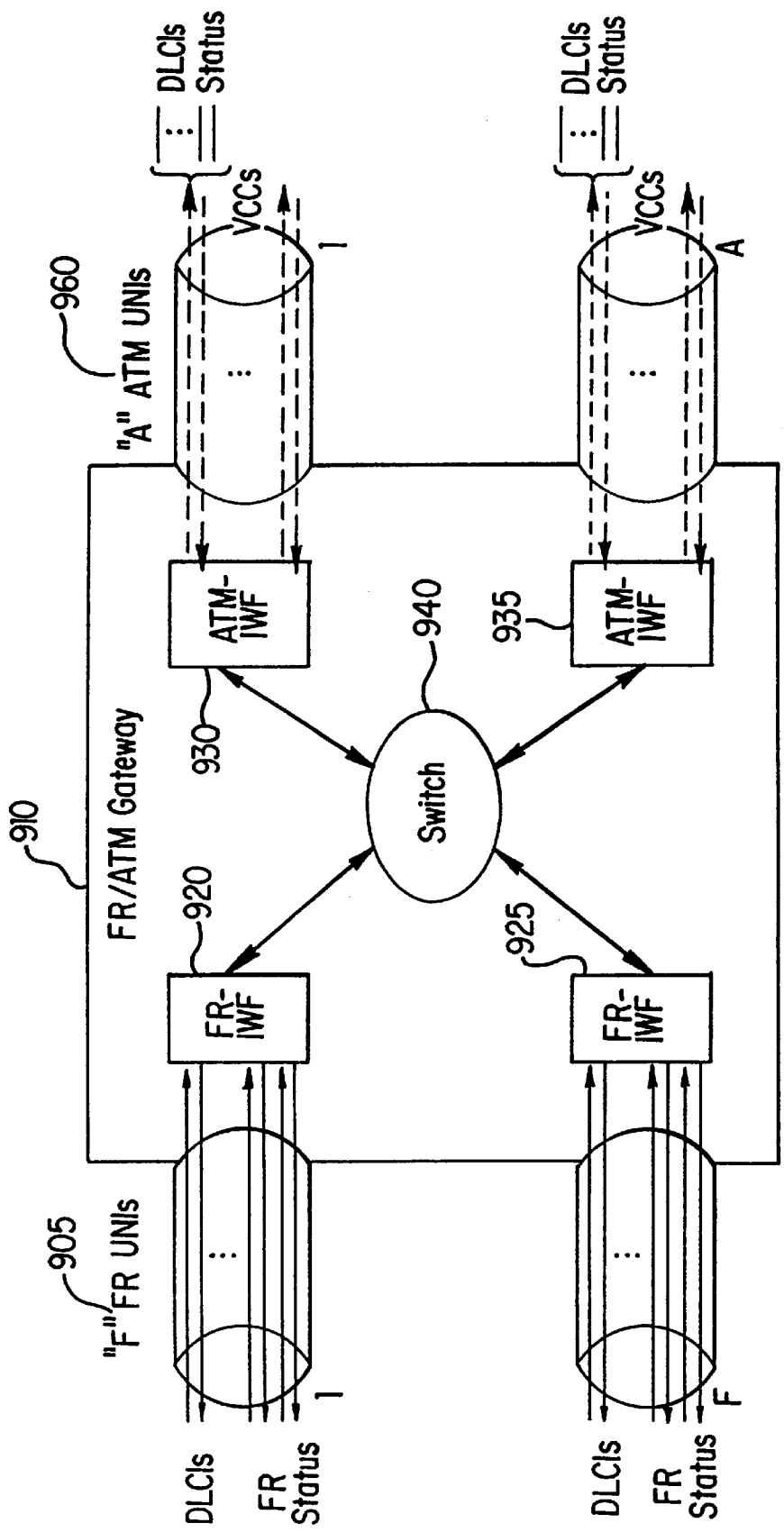
FIG. 9 is a block diagram of a Frame Relay/ATM Gateway according to the present invention.

The detailed operation of a FR/ATM gateway in a resilient NNI according to the present invention, is described with reference to FIGS. 9 to 13. As shown in FIG. 9, FR/ATM gateway 910 has multiple physical interfaces on a frame relay side (FR-UNIs 905) and multiple physical interfaces on the ATM side (ATM-UNIs 960). Frame Relay-Interworking Function (FR-IWF) modules 920, 925 couple data between respective FR-UNIs 905 and a switch 940. ATM-Interworking Function (ATM-IWF) modules 930, 935 couple data between respective ATM-UNIs 960 and the switch 940.

Each FR UNI 905 receives a serial data signal consisting of one or more logical Data Link Connection Identifier (DLCI) channels and a FR status signaling channel. These logical DLCIs are shown as separate pairs of arrows in the FR UNIs 905. These DLCIs are physically realized as addresses in headers of the frames passed serially on the physical FR UNI, as would be apparent to one skilled in the art.

The FR UNIs can be viewed as being controlled by a FR Inter-Working Function (IWF). Each ATM UNI contains multiple VCCs, for instance, a pair of VCCs can be used as described earlier. Each VCC carries one or more DLCIs and a FR status signaling channel according to the standard FR/ATM Network Interworking protocol. In ATM, a VCC is identified by Virtual Channel Identifier (VCI) and Virtual Path Identifier (VPI) cell header fields. The VCI field is used to switch virtual channels. The VPI field is used to switch virtual paths, that is, groups of virtual channels. The data is switched between the FR IWF and ATM IWF blocks using either a frame or cell based switch 940.

Figure 10:
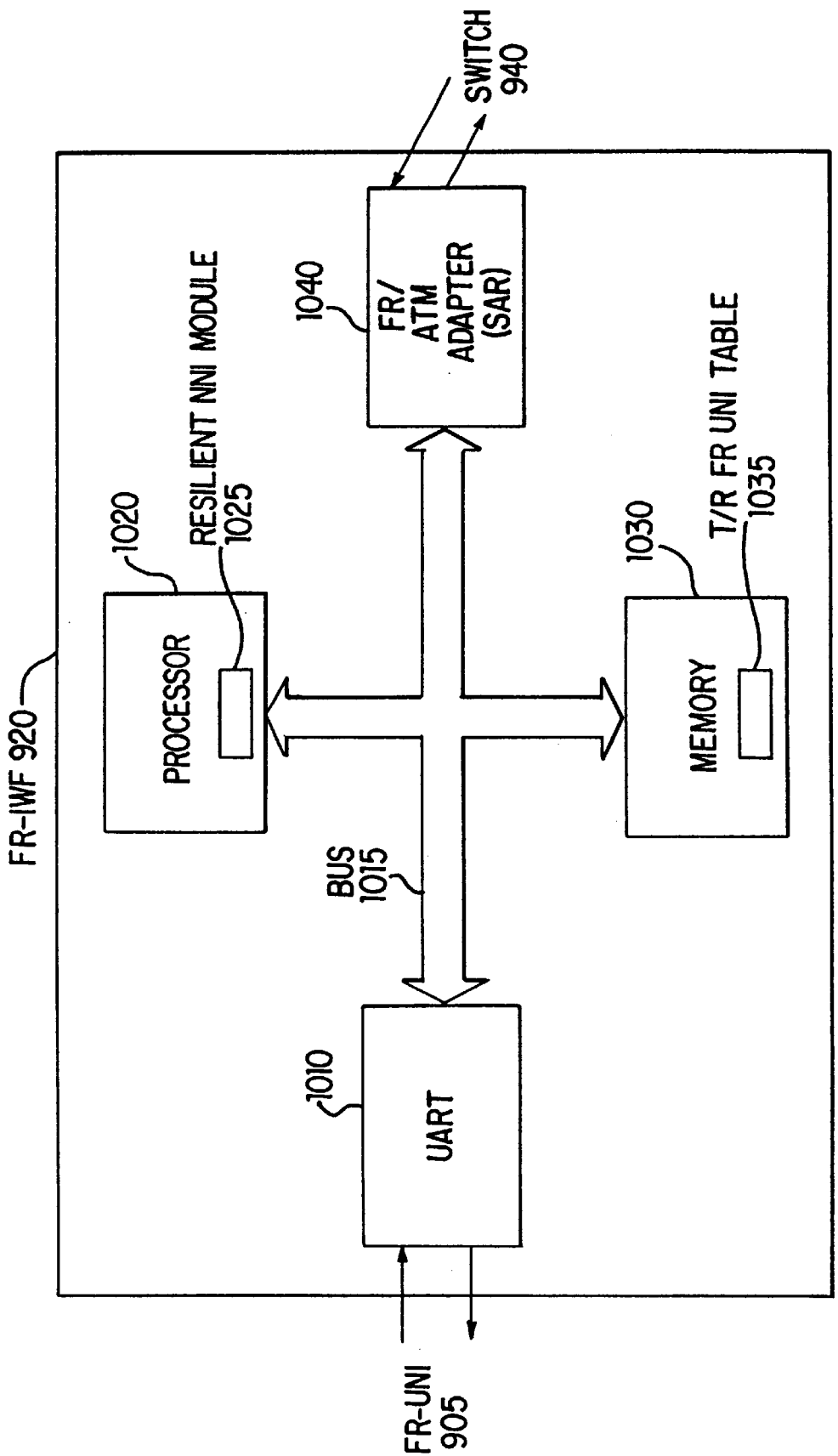
FIG. 10 is a block diagram of a Frame Relay InterWorking Function module according to the present invention.

FIG. 10 is a block diagram of an example FR-IWF module 920 (or 925). In particular, FR-IWF module 920 includes a data bus 1015 interconnecting a Universal Asynchronous Receiver/Transmitter (UART 1010) that connects to a FR UNI 905, a processor 1020, a Resilient NNI module 1025, memory 1030, and a FR/ATM adapter 1040. Memory 1030 includes storage for T/R FR UNI table 1035.

Figure 11:
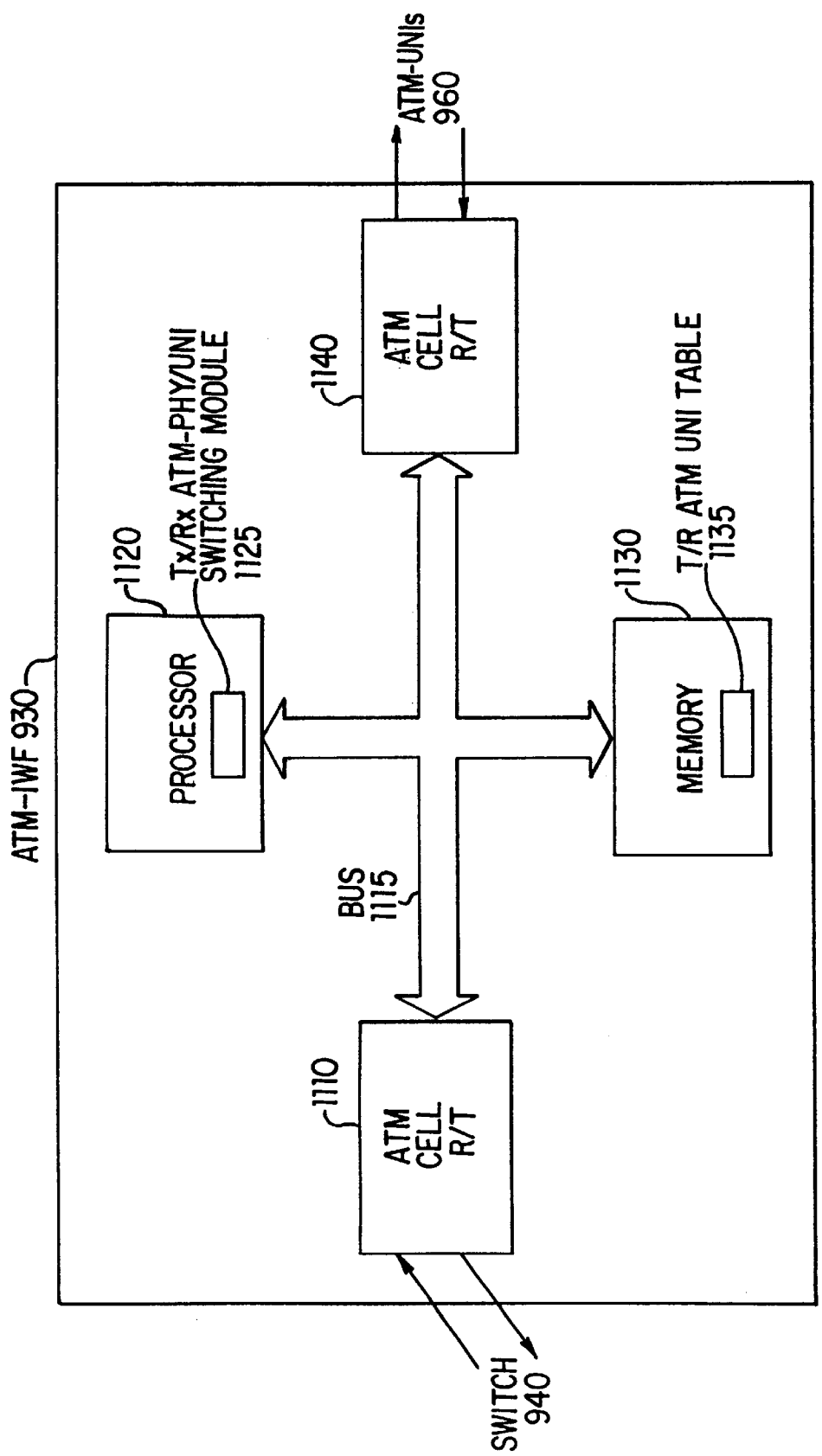
FIG. 11 is a block diagram of an ATM Interworking Function module according to the present invention.

FIG. 11 is a block diagram of an example ATM-IWF module 930 (or 935). In particular, ATM-IWF module 930 includes a data bus 1115 interconnecting ATM Cell Receiver/Transmitters 1110 and 1140, a processor 1120, Rx-ATM PHY Transmission Module 1125, and memory 1130. Memory 1135 includes storage for a T/R ATM UNI table 1135.

FIGS. 10 and 11 are configured for an ATM cell-based switch 940. Accordingly, a FR/ATM adapter 1040, or in other words, a Segmentation and Reassembly (SAR) module unit, is included in each FR-IWF on the frame relay side of switch 940 to convert the data from frame relay packets to ATM cells. Switch 940 then routes the output ATM cells according to known switching methods through the proper ATM-IWF modules 930, 935 and ATM-UNIs 960. Any type of SAR architecture can be used. See, for example, the store-and-forward and direct-transfer architectures discussed by Bry, C., "Low-Cost Cards Can Help ATM Happen," *Electronic Engineering Times*, Sep. 18, 1995, page 60 (incorporated by reference herein).

As would be apparent to one skilled in the art, switch 940 can also be frame-based. In such a case, FR-IWFs 920, 925 would route data in a frame relay format to switch 940. Conversion of the data from FR format to ATM cells (i.e. SAR) would be conducted in the ATM-IWF modules 930, 935 prior to sending the data in ATM cells over ATM-UNIs 960. FR status signaling messages would likewise be used between the FR-IWF and ATM-IWF modules.

Figure 12:
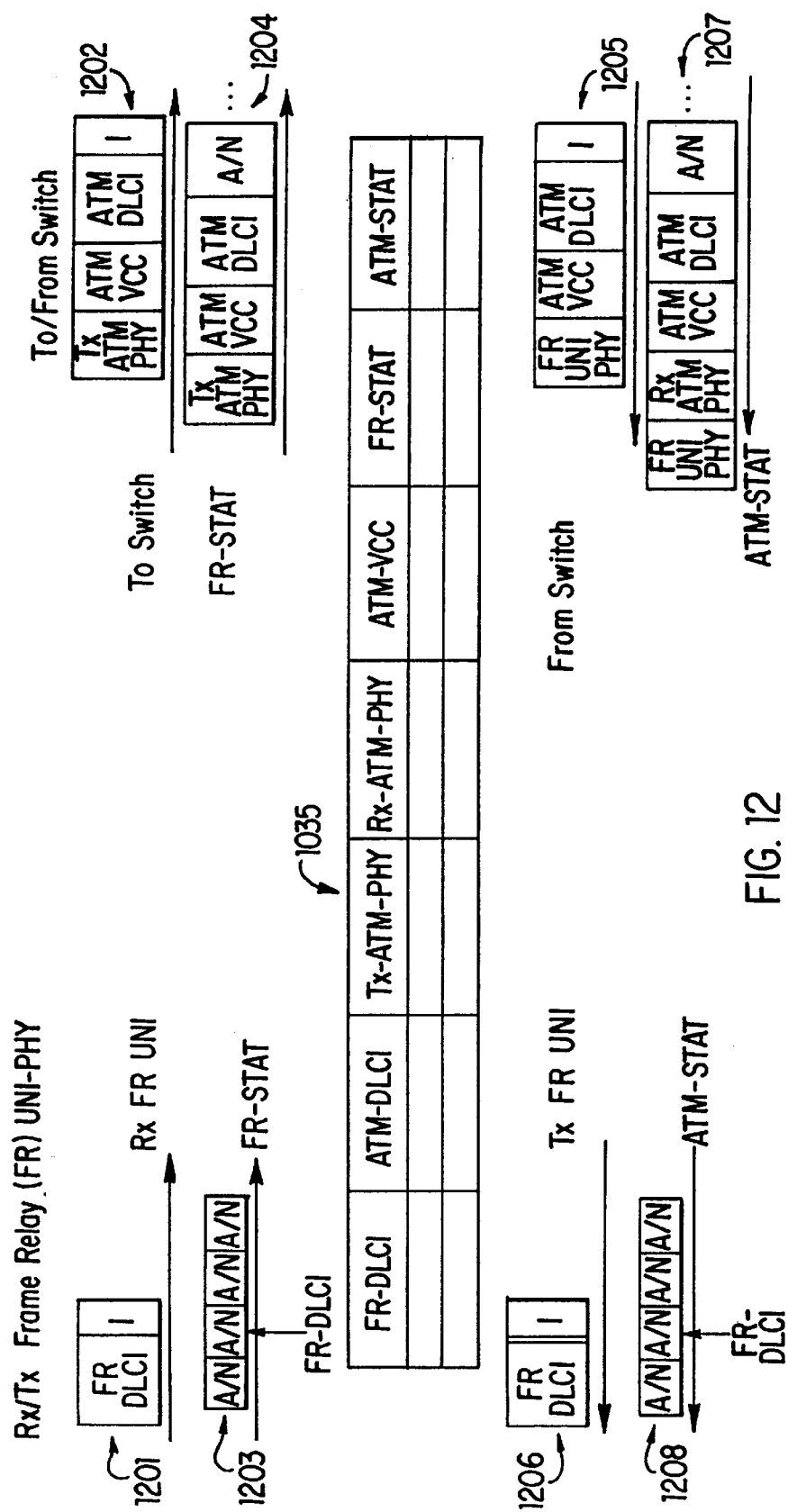
FIG. 12 is a diagram showing the processing of data through a FR-IWF module according to the present invention.
Figure 13:
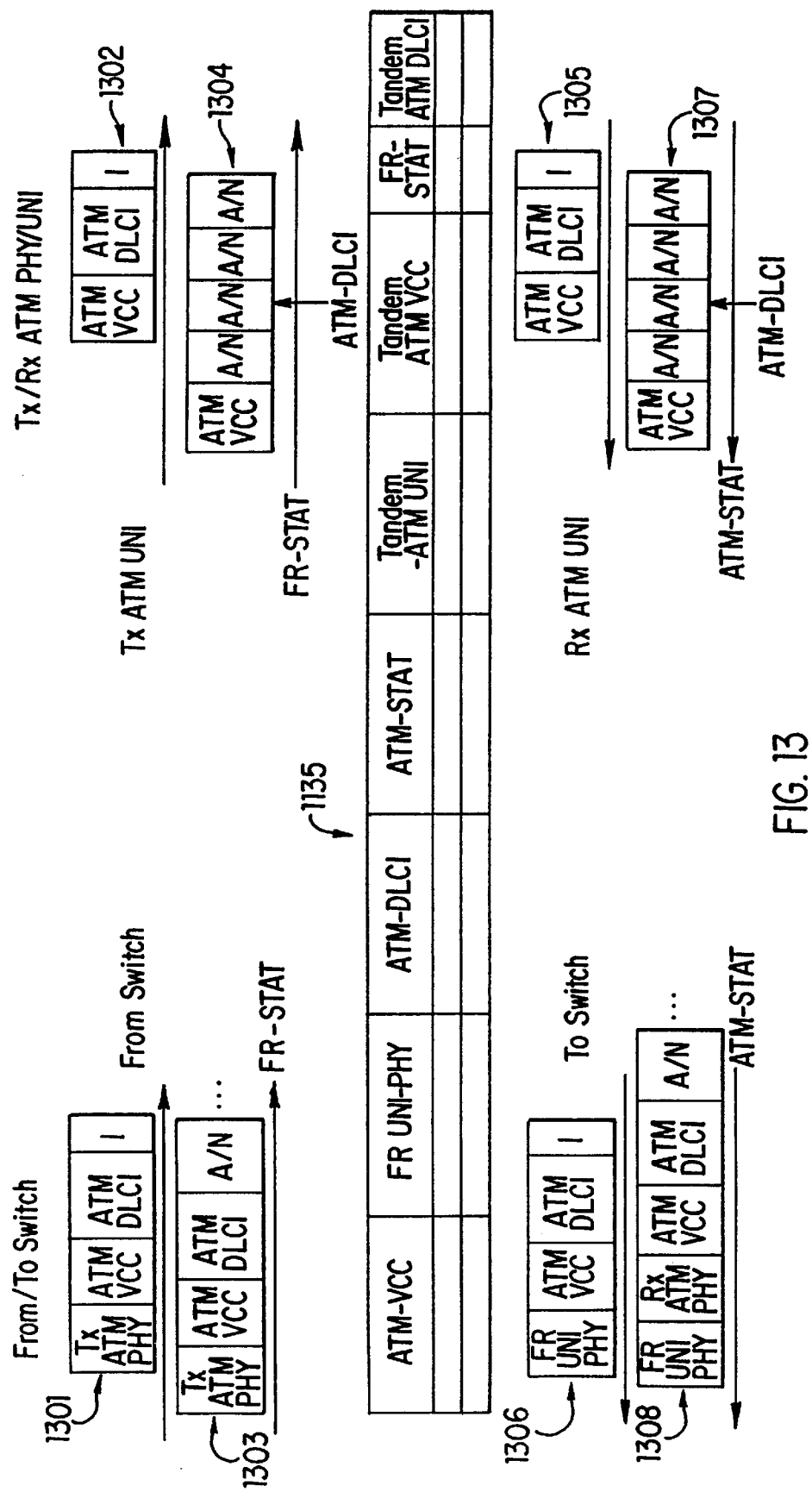
FIG. 13 is a diagram showing the processing of data through an ATM-IWF module according to the present invention.

The operation of a resilient FR/ATM gateway in a NNI according to the present invention will now be explained with reference to FIGS. 12 and 13. In particular, the response of FR-IWF and ATM-IWF modules to an ATM-UNI failure will be described.

A. Frame Relay InterWorking Function (FR-IWF)

The operation of an FR-IWF module 920 is described with reference to FIG. 12. In particular, FIG. 12 shows the serial flow of data and status signaling from a particular FR UNI input, Rx FR-UNI, through FR-IWF 920 to a cell-switch 940. UART 1010 receives user data frames 1201 from Rx FR UNI. The user data frames 1201 include a header indicating the particular FR DLCI followed by user data information field I.

Processor 1020 (and/or FR/Adapter 1040) uses the received FR-DLCI to index a row in Table 1035 having corresponding Tx ATM PHY, ATM VCC and ATM DLCI information. FR/ATM adapter 1040 segments and reassembles (SAR) the data from a frame to cell format. The Tx ATM PHY, ATM VCC and ATM DLCI information is used as a prefix for the data I in the ATM cells 1202 output from FR/ATM adapter 1040 to the cell-switch 940.

FR status signaling messages FR-STAT 1203 are also received serially by UART 1010 through the Rx FR-UNI. According to standards, one FR-DLCI (i.e. "channel") is reserved for FR-status signaling. For example, the FR status signaling messages 1203 can occupy a FR-DLCI 0.

The function of the FR status signaling messages 1203 is to indicate which FR-DLCIs are active. An active FR-DLCI is identified by an active bit indication (A) which trails each FR-DCLI in the FR status signaling message. For example, if FR-DLCIs 1 and 12 are active, a serial FR-status message would consist of the FR-DLCIs 1 and 12, each followed by an active bit A indication "1". A new bit N is included for indicating a newly-added FR-DLCI, however, this bit is not necessarily used to effect a resilient NNI in the present invention. Finally, processor 1020 reads the FR-status signaling messages 1203 received by UART 1010 and records the status (FR-STAT) of each active FR-DLCI in Table 1035.

Periodically, all FR-STAT, ATM DLCI status indications for a single Tx ATM PHY, ATM VCC are collected in an ATM-STAT status message 1204 sent to the ATM UNI identified by the Tx ATM PHY field. ATM-STAT message 1204 is then sent through FR/ATM adapter 1040 via the switch 940 to either the ATM-IWF modules 930, 935 as indicated by the Tx ATM PHY field according to the standard protocol shown in FIG. 3.

Considering the reverse flow of data, FR-ATM adapter 1040 also converts user data I received as one or more cells 1205 from the switch 940 into one or more frames 1206. Frames 1206 are sent over the FR-UNI physical interface identified by the FR-UNI PHY field included with cells 1205. The received ATM VCC and ATM DLCI fields in cells 1205 are used by processor 1020 to index a row in the Table 1035. Processor 1020 (and/or FR/ATM adapter 1040) identifies the FR-DLCI corresponding to the received ATM VCC and ATM DLCI values based on the Table 1035. The FR-DLCI and corresponding received user data I are then sent in frames (1206) by UART 1010 over a Tx-FR UNI.

An ATM status-signaling message 1207 is received periodically from an ATM-IWF module through switch 940. The ATM-STAT status signaling message 1207 flags active ATM logical connections by transmitting an active bit "1" after ATM VCC and ATM DLCI fields which identify the active logical connection. An FR-UNI PHY field is included to identify a specific Tx FR-UNI physical interface for returning the user information data I through UART 1010 to an FR-end system once it has been converted by FR/ATM Adapter 1040 from cells to frames.

Periodically, processor 1020 collects the ATM-STAT entries for each FR UNI PHY and transmits these as Q.933 Annex A FR status messages 1208 over the FR UNI to the FR end system.

According to the present invention, the ATM-STAT signaling message 1207 further includes a Rx ATM PHY field for identifying the ATM UNI physical interface in the set of ATM UNIs 960 through which the data was received from the self-healing network. Processor 1020 stores the Rx ATM PHY value in Table 1035 in a row based on the received ATM VCC and ATM DLCI information in the ATM-STAT message 1207.

1. Resilient NNI Module

Processor 1020 further includes a Resilient NNI Module 1025 for comparing the Rx ATM PHY values and Tx ATM PHY values in RIT ATM Table 1035 to determine whether the values differ. Examining the ATM recovery scenarios discussed earlier with respect to FIG. 5, the Rx ATM PHY value differs from the Tx ATM PHY value only when the self-healing ATM network has automatically recovered from a UNI failure. As a result, when the Rx ATM PHY is found to differ from the Tx ATM PHY, then the Resilient NNI module 1025 updates the Tx ATM PHY to equal the received Rx ATM PHY. In this way, data communication from the FR/ATM gateway is transmitted through the ATM physical interface used most recently by the self-healing network. More generally, the Tx ATM PHY can be updated to another ATM physical interface such as a preconfigured back-up trunk if switching to another interface is desired. The destination gateway would then switch over to this interface employing the previously described protocol.

B. ATM Inter Working Function (ATM-IWF)

The operation of the ATM IWF 930 is described with reference to FIGS. 11 and 13. In particular, FIG. 13 shows the serial flow of data and status signaling through ATM-IWF 930. ATM cells 1301, which include Tx ATM PHY, ATM VCC, ATM DLCI, and user data I as described earlier, are received from cell switch 940 by ATM cell receiver/transmitter 1110. Processor 1120 (and/or ATM R/T 1110) stores the ATM VCC and ATM-DLCI header information in a row of Table 1135. ATM R/T 1140 forwards ATM cells 1302, consisting of the ATM VCC and ATM DLCI header information and data I, to a particular transmit ATM UNI physical interface, Tx ATM UNI, as identified by the Tx ATM PHY field.

Unmultiplexed FR status signaling messages FR-STAT 1303 are also received serially by ATM R/T 1110 from the switch 940. FR-STAT 1303 indicates which FR logical connection is active. In particular, FR-STAT 1303 includes a stream of Tx ATM PHY, ATM VCC, and ATM DLCI information for identifying a specific active FR logical connection mapped to an ATM VCC followed by an active bit which is set to "1." Periodically, the FR-STAT is collected for all ATM-DLCIs on a single ATM VCC and transmitted in a FR-STAT message 1304 according to the Q.933 Annex A protocol. Note Tandem-ATM UNI and Tandem ATM VCC fields are included in Table 1135 for identifying a paired tandem node in hierachial networks.

Considering the reverse flow of data, ATM cells 1305 are received by ATM R/T 1140 from the self-healing network through a receive ATM UNI physical interface, Rx ATM UNI. Processor 1120 (and/or ATM RIT 1110) looks up the FR-UNI PHY value corresponding to the ATM-VCC and ATM DLCI information in the Table 1135. The FR-UNI PHY value identifying the FR physical interface (i.e. port) is packaged with other cell information (ATM VCC, ATM DLCI, and data I), and sent as cells 1306 from ATM R/T 1110 to cell switch 940.

An ATM status signaling message 1307 corresponding, for example, to a standard Q.933 Annex A status message, is also received periodically. Processor 1120 demultiplexes ATM-STAT 1307 into the row indicated by ATM VCC and the ATM-DLCI indicated in the status message. Periodically, the status 1308 for all DLCIs destined for a particular FR UNI is collected and sent to the FR UNI indicated by the FR UNI PHY field. Thus, the ATM-STAT 1308 includes FR-UNI PHY, ATM VCC, ATM DLCI information and an active bit set to that set by the other gateway.

1. Tx/Rx ATM-PHY/UNI Switching Module

According to the present invention, a Tx/Rx ATM-PHY/UNI Switching module 1125 is added to communicate which ATM UNI physical interface, Rx ATM PHY, received cell data from the self-healing network. In particular, switching module 1125 issues a Rx-ATM PHY field value identifying the received Rx ATM UNI which is incorporated in the ATM status signaling ATM-STAT 1308. Because the Rx-ATM UNIs are connected in a one-to-one correspondence with each ATM-IWF module, each ATM-IWF module can issue a dedicated Rx ATM PHY field for identifying the Rx ATM UNI.

The switching module 1125 can be included, for example, in processor 1120 as shown, or alternatively as a separate unit or within ATM R/T 1110. As would be apparent to one skilled in the art, the relatively simple communication of the received ATM physical interface, Rx ATM-PHY, in the ATM-status 1308 per VCC is the only additional information beyond the standard FR/ATM network interworking protocol required to implement the resilient NNI function within the ATM-IWF 930.

The inventor has discovered a FR/ATM gateway which achieves a resilient NNI in conjunction with failure recovery in a self-healing ATM network, for example, one employing SVCs. Because switching occurs in the gateway, based upon a Rx-ATM-PHY field value generated for each ATM-UNI, this invention extends to more than two ATM-UNIs on a FR/ATM gateway, allowing larger networks to be constructed.

In the case of diversely routed ATM PVCs, as shown in FIG. 8, each FR IWF 920 must detect the absence of status messages and try the alternate ATM PHY for the same VCC. The disadvantages of this method are that twice as much VCC bandwidth must be reserved in the ATM network, and the additional complexity of the status message loss detection and retransmission logic.

VI. Example Four Node Full Mesh Network

Figure 14:
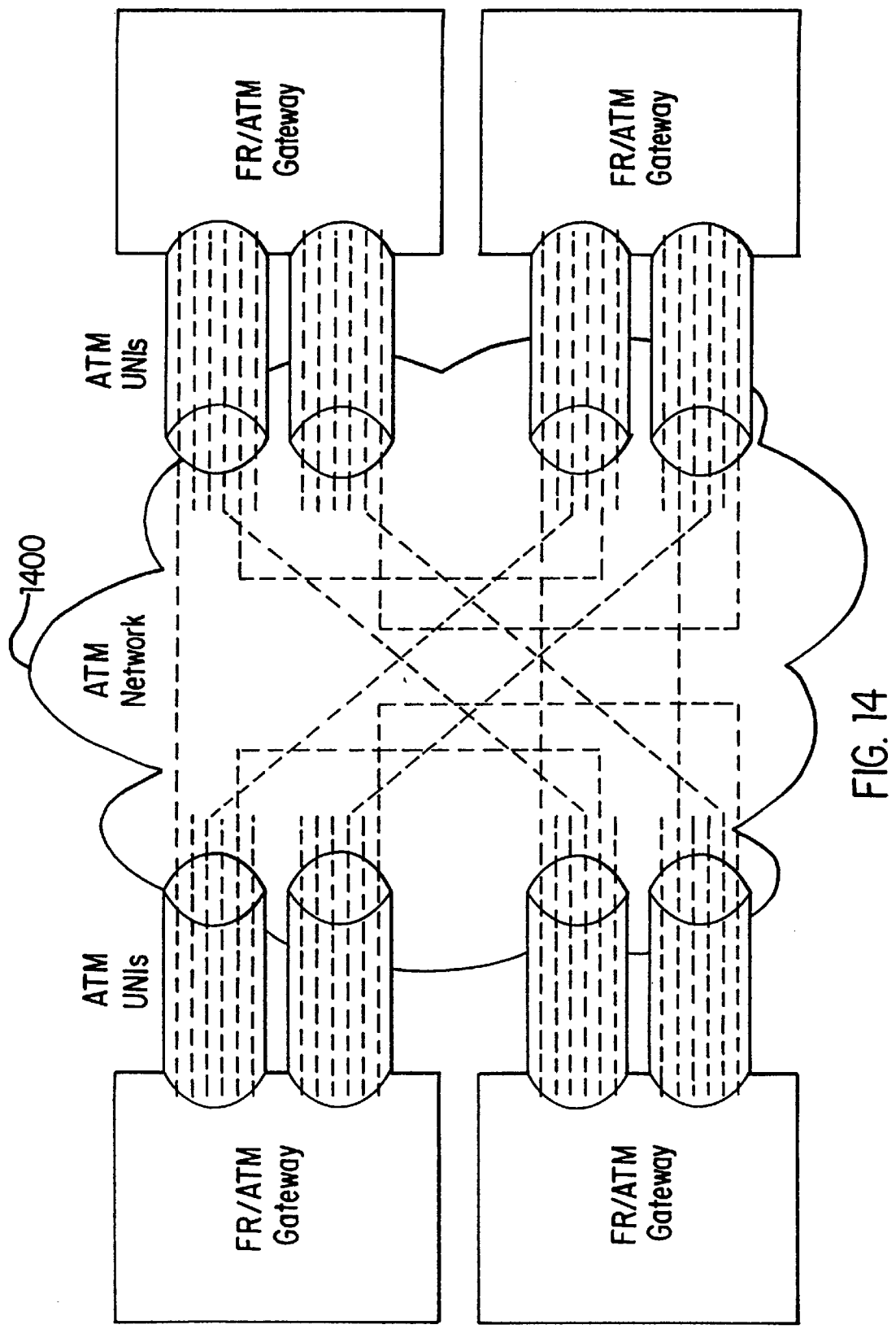
FIG. 14 is an example of a four node full mesh ATM network for use in the present invention.

This basic protocol for establishing a resilient NNI, as described above, applies to a full-mesh network of four FR-ATM gateways 1400 as illustrated in FIG. 14. For A=2 ATM UNIs per FR/ATM gateway for a network of N gateways, each UNI must have N(N-1) VCCs. Practically, this limits a network to a size on the order of N=100 nodes.

Increasing the number of ATM UNIs to A, on the gateways requires A*N*(N-1)/2/(A-1) VCCs per UNI. This increases the network size, but consumes gateway capacity for the ATM UNIs. As a larger number of DLCIs is required between FR/ATM gateways, multiple parallel VCCs can be defined. If the number of DLCIs is much less than that supported by the FR status message, then the DLCIs can be arranged in blocks to achieve forwarding across ATM VCCs to a destination cluster in a hierarchical manner. Assignment of VCCs to ATM UNIs, and ATM-VCCs plus ATM-DLCIs to tandem switching interfaces on FR/ATM gateways effectively define virtual trunks. Therefore, the optimal hierarchy is naturally defined by the offered traffic.

Further, as would be apparent to one skilled in the art given this description, the following three levels of hierarchy are supported within this scheme, determined by the prefix of the encapsulated cell and status signaling: (1) ATM–VCC+ATM–DLCI, (2) ATM VCC, and (3) ATM Virtual Path Connection (VPC).

VII Illustration of Two-Level Hierarchy

Figure 15:
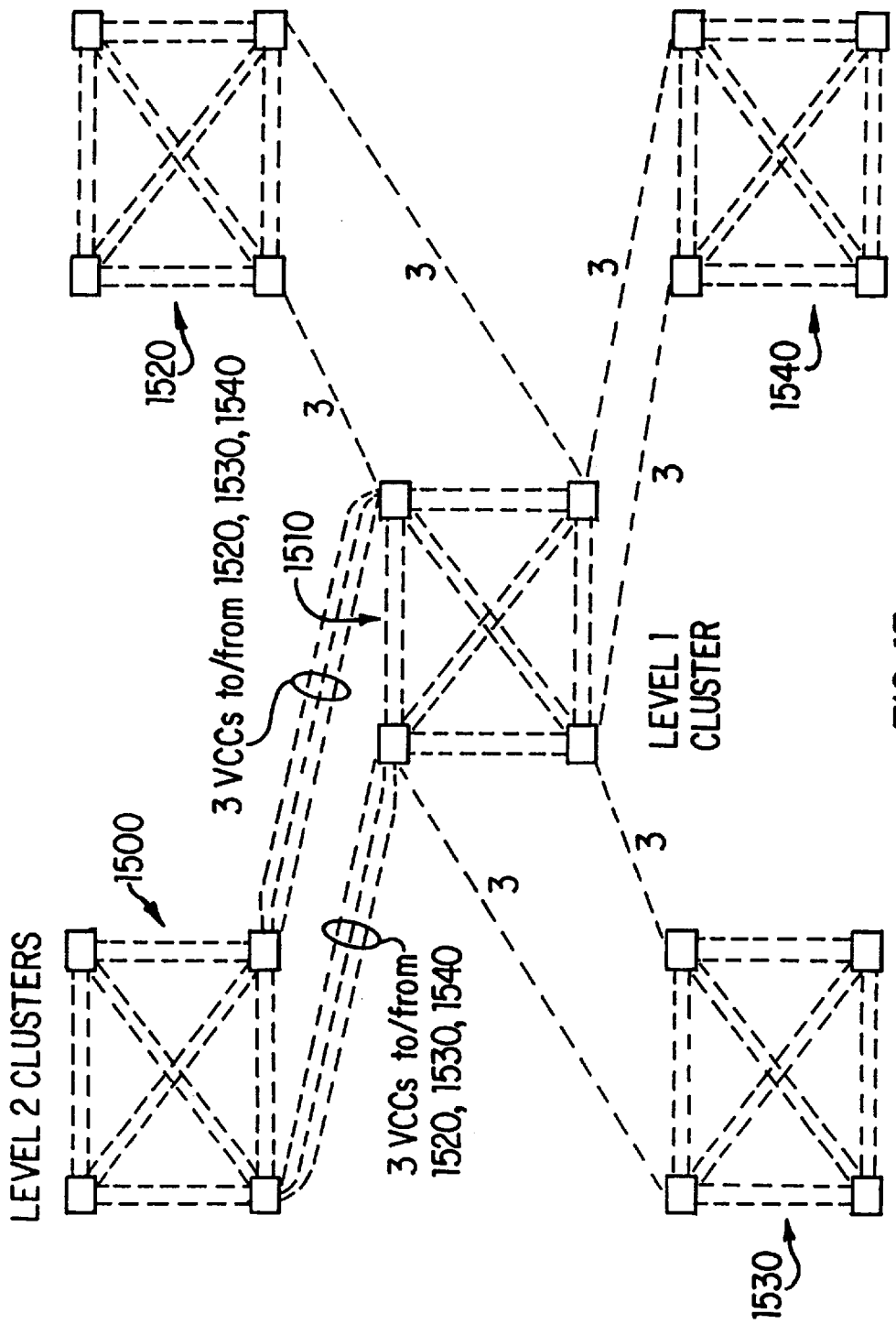
FIG. 15 illustrates a two-level network hierarchy incorporating resilient NNI according to the present invention.

By allocating certain ATM-VCCs and ATM-DLCIs to a tandem switching function, hierarchical interconnected networks such as those illustrated in FIG. 15 can be constructed. Five fully-meshed four-node clusters 1500–1540 are interconnected through tandem node pairs. Each four-node cluster has detailed fully meshed VCC connectivity as described previously with respect to the network 1400 in FIG. 14. Accordingly, the boxes represent FR/ATM gateways, and the connecting dashed lines represent ATM VCCs. The tandem node pairs interconnect the four-node clusters 1500–1540 through three separate VCCs.

For each ATM-IWF in a FR/ATM gateway, Tandem ATM-UNI and Tandem ATM VCC is stored in the Table 1135. When a cell is received from an ATM UNI, the received ATM-VCC is used to index a table entry which has a Tandem ATM-UNI and Tandem ATM VCC that is connected to another hierarchical FR/ATM gateway. Multiplexing of FR status signaling information is done in the manner previously described.

Blocks of ATM DLCIs can be assigned within ATM-VCCs to destination clusters at the lower level in the hierarchy. Alternatively, the Tandem ATM DLCI field may be employed at the entry and exit switches at the next higher level in the hierarchy. These values may be arbitrarily chosen, for example according to a SVC protocol. The cells corresponding to a frame are switched at the ATM VCC level out another ATM UNI across the next level up in the hierarchy to a switch adjacent to the destination next lower level of the hierarchy. In the example shown in FIG. 15, this means that 3 VCCs are connected from each level 2 cluster to each level 1 cluster node. Here the receive VCC is translated to a destination ATM UNI and ATM-VCC which is connected to the destination FR/ATM Gateway. In this way much larger, stable, hierarchical networks can be constructed.

VIII. Resilient NNI between Proprietary Frame Relay Networks

Figure 16:
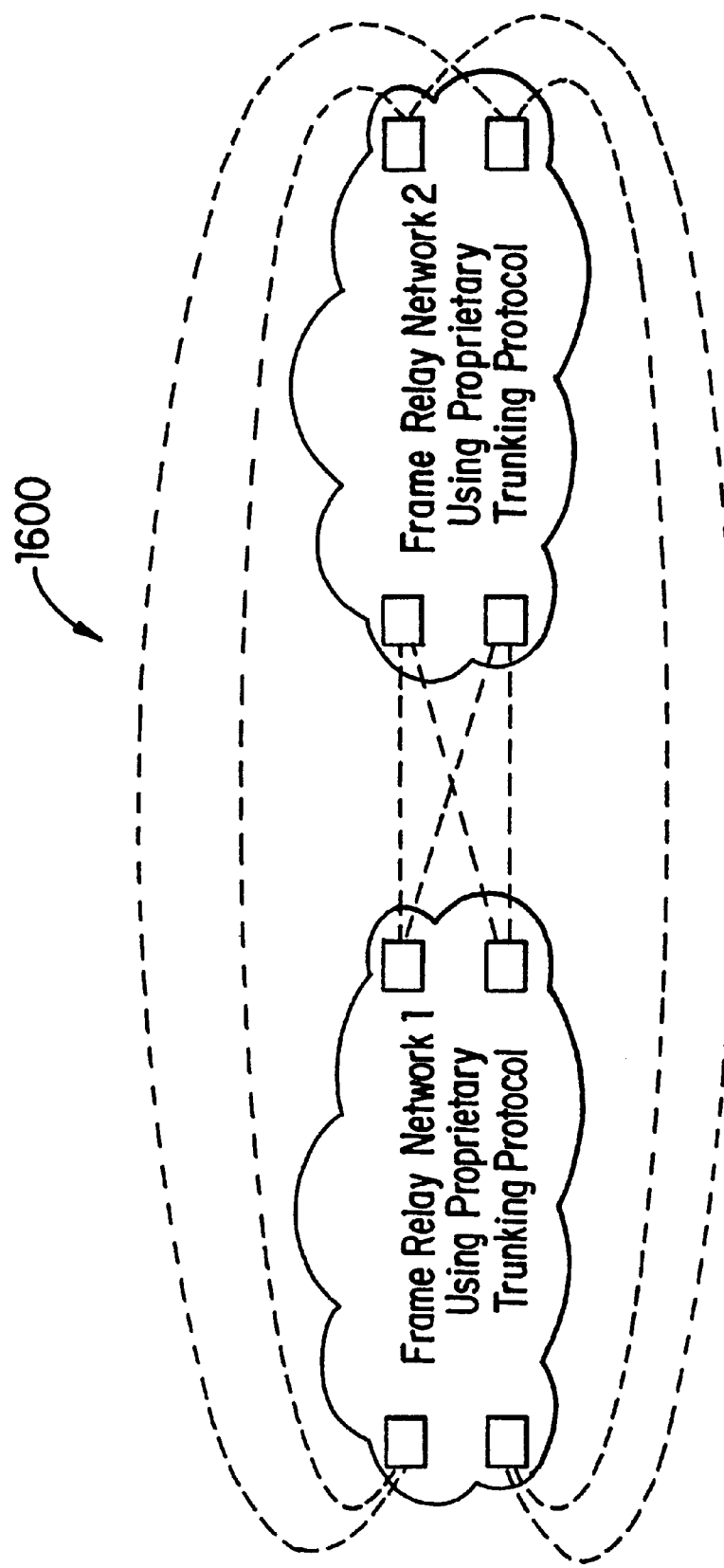
FIG. 16 shows a resilient NNI, according to the present invention, configured between Proprietary Frame Relay Networks.

This invention also applies to the interconnection 1600 of Frame Relay networks which may use a proprietary routing protocol internally as illustrated in FIG. 16. The FR/ATM Network Interworking switching is done only between edges of the networks. If the connection is made by dedicated circuits between the networks, then the switching based upon interface failure detection can be done as described for the case of ATM PVCs, or by the gateways participating in ATM signaling directly between themselves.

IX. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

X. Acronym Appendix

| | |
|---|---|
| FR | Frame Relay |
| ATM | Asynchronous Transfer Mode |
| VCC | Virtual Channel Connection |
| UNI | User-Network Interface |
| NNI | Network-Network Interface |
| DLCI | Data Link Connection Identifier |
| IWF | Interworking Function |
| B-ISDN | Broadband Integrated Services Digital Network |
| TCP/IP | Transmission Control Protocol/Internet Protocol |
| SNA | System Network Architecture |
| FR-SSCS | Frame Relay Service Specific Convergence Sublayer |
| PVC | Permanent Virtual Circuits |
| SVC | Switched Virtual Connection |
| VPC | Virtual Path Connection |
| PHY | Physical Interface |
| VCI | Virtual Channel Identifier |
| VPI | Virtual Path Identifier |

What is claimed is:

1. A Frame Relay-Asynchronous Transfer Mode (FR-ATM) gateway apparatus for resilient interconnection of a first frame relay (FR) end-user system to a self-healing ATM network, comprising:

at least one frame-relay interworking function (FR-IWF) module for connection to a corresponding FR physical interface (FR UNI);

a plurality of ATM interworking function (ATM-IWF) modules for connection to respective ATM physical interfaces (ATM UNI); and a switch coupled between said at least one FR-IWF module and said plurality of ATM-IWF modules;

wherein each ATM-IWF module includes:
means for transmitting a Rx ATM PHY field in response to receiving ATM cells from said ATM network, said Rx ATM PHY field identifying a receive ATM UNI physical interface (Rx ATM UNI) through which said ATM cells were sent from said ATM network to the FR/ATM gateway; and wherein said at least one FR-IWF module includes:
means for storing a first Tx ATM-PHY field, said Tx ATM-PHY field identifying a transmit ATM physical interface (Tx ATM UNI) used to transmit cell data from the FR/ATM gateway to the ATM network;
means for monitoring a first Rx ATM-PHY field sent from a ATM-IWF module through said switch; and means for comparing said first Tx ATM-PHY field and said first Rx ATM-PHY field to determine whether said receive ATM physical interface differs from said transmit ATM physical interface as a result of self-healing in the ATM network.

2. The apparatus of claim 1, wherein said at least one FR-IWF module further includes means for changing said Tx ATM-PHY field to match said Rx ATM PHY field when said comparing means indicates said Tx ATM-PHY and Rx ATM-PHY fields differ, whereby, said receive ATM physical interface becomes the transmit ATM physical interface.

3. The apparatus of claim 1, wherein said at least one FR-IWF module further includes means for changing said Tx ATM-PHY field to another Tx ATM field identifying another transmit ATM physical interface when said comparing means indicates said Tx ATM-PHY and Rx ATM-PHY fields differ.

4. The apparatus of claim 1, wherein said transmit ATM physical interface comprises a primary trunk and said receive ATM physical interface comprises a back-up trunk.

5. The apparatus of claim 1, wherein said switch comprises a frame switch or a cell switch.

6. The apparatus of claim 1, wherein the first Frame Relay end-user system comprises at least one of a FR-terminal, FR-server, and FR network.

7. The apparatus of claim 1, wherein said Rx ATM PHY field is transmitted in a status signaling message internal to the FR/ATM gateway from an ATM-IWF module to a FR-IWF module.

8. The apparatus of claim 1, wherein said Tx ATM-PHY field and said Rx ATM PHY field are transmitted in status signaling messages between said at least one FR-IWF module and said plurality of ATM-IWF modules.

9. A method for resilient communication between frame relay (FR) end-user systems interconnected through a self-healing ATM network, wherein the ATM network includes a plurality of ATM physical interfaces coupled to a FR/ATM switching gateway for carrying data in a stream of ATM cells between the ATM network and the FR/ATM switching gateway, comprising the steps of:

storing a Tx ATM-PHY field, said Tx ATM-PHY field identifying a transmit ATM physical interface used to transmit the stream of ATM cells resulting from user and control frames from the FR/ATM gateway to the ATM network;

transmitting a Rx ATM PHY field in response to receiving ATM cells from said ATM network, said Rx ATM PHY field identifying a receive ATM physical interface through which said ATM cells were sent from said ATM network to the FR/ATM gateway; and comparing said first Tx ATM-PHY field and said first Rx ATM-PHY field to determine whether said receive ATM physical interface differs from said transmit ATM physical interface as a result of self-healing in the ATM network.

10. The method of claim 9, further comprising the step of:
changing transmission of ATM cells from said transmit ATM physical interface to said receive ATM physical interface when said comparing steps indicates said receive ATM physical interface differs from said transmit ATM physical interface.

11. The method of claim 9, further comprising the step of:
transmitting ATM cells on an ATM physical interface other than said transmit ATM physical interface when said comparing steps indicates said receive ATM physical interface differs from said transmit ATM physical interface.

12. The method of claim 9, further comprising the steps of:
pre-configuring said ATM physical interfaces as a primary trunk and at least one back-up trunk for the FR/ATM gateway, said transmit ATM physical interface corresponding to said primary trunk and said receive ATM physical interface corresponding to one of said at least one back-up trunks; and changing transmission of ATM cells on one of said at least one back-up trunks when said comparing steps indicates said receive ATM physical interface differs from said transmit ATM physical interface.

13. A system for resilient end-to-end interconnection of first and second frame relay (FR) end-user systems through a self-healing network, comprising:

a first user-network switching gateway coupling data between said first FR end-user system and said self-healing network;

a second user-network switching gateway coupling data between said second FR end-user system and said self-healing network; and first and second sets of user—self-healing network physical interfaces, said first set of user—self-healing network physical interfaces being connected between said first user—network switching gateway and said self-healing network, and said second set of user—self-healing network physical interfaces being connected between said second user—network switching gateway and said self-healing network;

said first user—network switching gateway comprising: a first frame-relay interworking function module, a first switch, and a first set of self-healing network interworking function modules connected respectively to said first set of user—self-healing network physical interfaces;

said second user-network switching gateway comprising: a second frame-relay interworking function module, a second switch, and a second set of self-healing network interworking function modules connected respectively to said second set of user—self-healing network physical interfaces; wherein at least said first frame-relay interworking function module includes:

means for storing a Tx-PHY field, said Tx-PHY field identifying a transmit physical interface in said first set of user- self-healing network physical interfaces used to transmit data from said first FR end-user system;

means for monitoring an RX-PHY field, said Rx-field identifying a receive physical interface in said first set of user—self healing network physical interfaces used to receive data bound for said first FR end-user system; and means for comparing said Tx-PHY field and said Rx-PHY field to determine whether said receive physical interface differs from said transmit physical interface in said first set of user—self healing network physical interfaces.

14. The system of claim 13, wherein said first frame-relay interworking function module further includes:
means for changing said Tx-PHY field to match said RX-PHY field when said comparing means indicates said Tx-PHY and Rx-PHY fields differ, whereby, said transmit physical interface is re-configured to said receive physical interface in said first set of user—self-healing network physical interfaces.

15. The system of claim 13, wherein said first switch comprises a frame-based or cell-based switch.

16. The system of claim 13, wherein said second switch comprises a frame-based or cell-based switch.

17. The system of claim 13, wherein the first and second frame-relay end-user systems each comprise at least one of a FR-terminal, FR-server, and FR network.

18. The system of claim 13, further including an ATM end-user system connected to said self-healing network.

19. The system of claim 13, wherein said self-healing network includes at least one of an ATM, B-ISDN, Internet, SNA, FR, and X.25 network.

20. A resilient communications internetwork comprising:

a plurality of interconnected nodes, each node including a Frame Relay-Asynchronous Transfer Mode (FR-ATM) gateway apparatus comprising:

at least one frame-relay interworking function (FR-IWF) module for connection to a corresponding FR physical interface (FR UNI);

a plurality of ATM interworking function (ATM-IWF) modules for connection to respective ATM physical interfaces (ATM UNI); and a switch coupled between said at least one FR-IWF module and said at least one ATM-IWF module;

wherein each ATM-IWF module includes:

means for transmitting a Rx ATM PHY field in response to receiving ATM cells from said ATM network, said Rx ATM PHY field identifying a receive ATM UNI physical interface (Rx ATM UNI) through which said ATM cells were sent from said ATM network to the FR/ATM gateway; and wherein said at least one FR-IWF module includes:

means for storing a first Tx ATM-PHY field, said Tx ATM-PHY field identifying a transmit ATM physical interface (Tx ATM UNI) used to transmit cell data from the FR/ATM gateway to the ATM network;

means for monitoring a first Rx ATM-PHY field sent from a ATM-IWF module through said switch;

means for comparing said first Tx ATM-PHY field and said first Rx ATM-PHY field to determine whether said receive ATM physical interface differs from said transmit ATM physical interface as a result of self-healing in the ATM network; and means for nodes that interconnect levels of the hierarchy to remultiplex DLCIs onto VCCs.

21. The system of claim 20, wherein said plurality of nodes comprise a full mesh cluster of nodes interconnected in a full mesh arrangement.

22. The system of claim 20, wherein said plurality of nodes comprise a hierarchial network.

23. The system of claim 20, wherein said plurality of nodes comprise multiple clusters of nodes arranged in hierarchial levels.

24. The system of claim 20, wherein said plurality of nodes comprise multiple clusters of nodes arranged in hierarchial levels, each cluster of nodes comprising nodes interconnected in a full mesh arrangement.

25. The system of claim 20, wherein said plurality nodes interconnect frame relay networks using proprietary trunking protocols.

26. A method for switching between a primary link and a back-up link at a network-network interface between a frame relay end-system and a self-healing network, comprising the steps of:

transmitting data between the frame relay end-system and the self-healing network over the primary link;

generating a status signaling message indicating a receive physical link; and transmitting data over the back-up link, instead of the primary link, when said status signaling message indicates said receive physical link differs from the primary link.

27. A resilient network-network interface for switching between a primary link and a back-up link coupling a frame relay end-system and a self-healing network, comprising:

means for transmitting data between the frame relay end-system and the self-healing network over the primary link;

means for generating a status signaling message indicating a receive physical link; and means for transmitting data over the back-up link, instead of the primary link, when said status signaling message indicates said receive physical link differs from the primary link.

* * * * *